United States Patent

Hsu et al.

[11] Patent Number: 5,581,691
[45] Date of Patent: Dec. 3, 1996

[54] WORK FLOW MANAGEMENT SYSTEM AND METHOD

[75] Inventors: Meichun Hsu, Los Altos Hills; Adel Ghoneimy, San Jose; Karl Kleissner, Los Gatos, all of Calif.

[73] Assignee: Digital Equipment Corporation, Maynard, Mass.

[21] Appl. No.: 516,729

[22] Filed: Aug. 18, 1995

Related U.S. Application Data

[63] Continuation of Ser. No. 830,654, Feb. 4, 1992, abandoned.
[51] Int. Cl.$^6$ .................................................. G06F 11/00
[52] U.S. Cl. ........................... 395/182.13; 395/185.04; 395/183.21
[58] Field of Search ................ 395/182.13, 182.14, 395/185.04, 184.01, 183.21, 550, 650; 364/281.3, 221.9, 220

[56] References Cited

U.S. PATENT DOCUMENTS

| | | | |
|---|---|---|---|
| 3,631,452 | 12/1971 | Richard | 340/309.5 |
| 4,503,499 | 3/1985 | Mason et al. | 364/200 |
| 4,535,456 | 8/1985 | Bauer et al. | 395/185.04 |
| 4,703,481 | 10/1987 | Fremont | 371/12 |
| 4,803,039 | 2/1989 | Impink, Jr. et al. | 376/216 |
| 4,805,107 | 2/1989 | Kieckhafer et al. | 364/200 |
| 4,815,014 | 3/1989 | Lipner et al. | 364/550 |
| 4,852,092 | 7/1989 | Makita | 371/12 |
| 5,021,947 | 6/1991 | Campbell et al. | 364/200 |
| 5,093,794 | 3/1992 | Howie et al. | 364/468 |
| 5,182,705 | 1/1993 | Barr et al. | 364/401 |

FOREIGN PATENT DOCUMENTS

| | | | |
|---|---|---|---|
| 0235958 | 9/1987 | European Pat. Off. | G06F 15/74 |

*Primary Examiner*—Robert W. Beausoliel, Jr.
*Assistant Examiner*—Joseph E. Palys
*Attorney, Agent, or Firm*—Diane C. Drozenski; Denis G. Maloney; Arthur W. Fisher

[57] ABSTRACT

A work flow description database represents long running work flows as a set of work units, called steps, with information flows therebetween. The description database defines each step's input and output signals, input condition criteria for creating an instance of the step, an application program associated with the step, and criteria for selecting a resource to execute the step. A work flow controller controls the process of executing instances of each defined type of work flow. Execution of a long running work flow begins when a corresponding set of externally generated input event signals are received by the work flow controller. During execution of a work flow, each step of the work flow is instantiated only when a sufficient set of input signals is received to execute that step. At that point an instance of the required type of step is created and then executed by a selected resource. After termination of a step, output signals from the step are converted into input event signals for other steps in the work flow in accordance with data stored in the work flow description database. Each step executes an application program and is treated as an individual transaction insofar as durable storage of its results. Log records are durably stored upon instantiation, execution and termination of each step of a work flow, and output event signals are also logged, thereby durably storing sufficient data to recover a work flow with virtually no loss of the work that was accomplished prior to a system failure.

15 Claims, 13 Drawing Sheets

Instantiation Condition For Stp71 =
C1{P and Q} OR C2{Q and R}

|  | 361-1 | 361-2 | 361-3 | 361-4 |  |
|---|---|---|---|---|---|
| Step Type ID | Stp71 | Stp71 | Stp71 | Stp71 | 362 |
| Condition ID | C1 | C1 | C2 | C2 | 364 |
| Port ID | P | Q | Q | R | 366 |
| Flag (Sufficient For Instantiation) | No | Yes | No | Yes | 368 |
| Position (In FIE Queue) | 1 | 2 | 1 | 2 | 370 |

WORK FLOW MANAGEMENT SYSTEM AND METHOD

This application is a continuation of application Ser. No. 07/830,654 filed Feb. 4, 1992, now abandoned.

The present invention relates generally to computerized work flow management, computerized coordination of tasks that require cooperative participation by multiple principals, and computerized coordination of long running processes that are being performed by a distributed set of computers and/or other principals.

BACKGROUND OF THE INVENTION

In the field of transaction processing, transactions are typically short lived computations that have a well defined beginning and end. Various protocols have been invented to ensure that all the participants in a transaction agree on how to terminate the transaction, most being based on the so-called two phase commit (2PC) protocol.

Important features of transaction processing systems is reliablity and atomicity. Reliability concerns things such as ensuring that the state of a system can be recovered after a failure, and that all interrupted transactions can be restarted or otherwise handled so that the system failure does not produce unpredicatble results. Atomicity means that every transaction is treated as an indivisble unit that is either successful, in which case the results of the transaction are durably stored, or aborted, in which case all data affected by the transaction are returned to their state prior to initiation of the transaction.

Work flow management typically involves processes, such as business activities, that have durations of minutes, hours, or even days, and therefore have much longer durations that the discrete transactions handled by traditional transaction processing systems. Work flow management also differs from traditional transaction processing systems in that a typical work flow may involve not only multiple computers or other machines, but also the participation of multiple human principals.

This document is concerned with long-lived activities, such as multi-user computations and business processes. Such activies are sometimes known as work flows. An example a work flow is one which collects data from a large number of sources, and then integrates that data in some way. The data collection process involves numerous interactions with various pieces of hardware and/or human principals, and the duration of the work flow may be extended, depending on the availability of all the required participating computers and other pieces of hardware. Another example of a long running work flow is the process of composing a newspaper edition, which requires cooperative efforts by many persons as well as by computers and other machinery.

It is a premise of the present invention that an important consideration in any activity management system is recovering from system failures. The activity management system must be able to automatically recover from virtually any system failure once the system is brought back on line. This means that the system must store sufficient data to determine what its state was just prior to the system failure, and to re-initiate processing of all interrupted units of work, herein called steps, with as little backtracking as possible.

In most transaction processing systems, system recovery is implemented by restarting all interrupted transactions at those transactions' beginning. Log records are stored at the beginning and end of each such transaction, enabling a system failure recovery routine to determine which transactions have been completed and which were in mid-process when a system failure occurred. This solution is not suitable for activity management systems handling long running work flows, since that recovery method would mean the redoing of much valuable work.

An additional problem that distinguishes long running work flows and short lived transactions is the problem of keeping sufficient records concerning the status of each transaction. For short lived transactions, it is generally sufficient to generate and store log records (A) marking the beginning of each transaction and recording sufficient data to restart that transaction, (B) recording changes made to various data structures so that those changes can be reversed if necessary, and (C) marking the conclusion of the transaction once the results of the transaction have been permanently stored. For long running work flows, backing up the system to undo all the work performed by the work flow up to the point of a system failure will typically be much more involved and in some cases may be virtually impossible.

Another problem associated with long lived activities or work flows concerns the use of data interlock mechanisms. In order to prevent two different computations from accessing and making inconsistent changes to a record in a database or to any other specified object, most multitasking computer systems provide interlock mechanisms that allow one process to have exclusive use of a specified object until the transaction either completes or explicitly releases its lock on the object. In most cases, a process maintains a lock on each object used by the process until either the process is completed and its results are permanently stored, or the process aborts and any interim changes are reversed. The problem associated with long lived activities is that locking the objects used by each work unit for a long period of time could result in system deadlock, where many work units are unable to proceed because other work units or work flows have locks on objects needed by the blocked work units. Clearly, the extent of the deadlock problem is related to the average number of objects used by each work flow and the average amount of overlap between work flows as to the objects used by those work flows. Nevertheless, the time duration of long lived work flows greatly increases the chances that work flows competing for resources will be delayed for significant periods of time.

One additional problem associated with long lived work flows that is not a problem with short lived transactions concerns tracking those work flows. For short lived transactions, it is generally sufficient to know that each transaction is either in process, in process but blocked from proceeding because a required resource is not available, aborted, or completed. However, for long lived work flows it is important to monitor the status of each work flow at a much greater level of detail.

In summary, problems that distinguish long lived work flows from short lived transactions are recovering interrupted work flows, deadlocks caused by data interlocks, and the need to be able to track or monitor the status of work flows that are in process.

SUMMARY OF THE INVENTION

In summary, the present invention is a work flow management system and method for executing and tracking the progress of long running work flows, and for recovering from system failures during the execution of long running work flows. Each type of long running work flow that will be used in a particular system is represented in a flow description database as a set of steps with data flows therebetween. Each step executes an application program and is treated as an individual computation insofar as durable storage of its results. Data flows between the steps are represented in the flow description database as arcs between the steps.

A flow controller controls the process of executing instances of each defined type of work flow. Execution of a work flow begins when a corresponding set of externally generated input event signals are received by the flow controller. During execution of a work flow, each step of the work flow is instantiated only when a defined set of input signals is received. At that point, an instance of the required type of step is created and executed, resulting in the generation of one or more output signals. Steps that are executed by human principals are performed by sending the human principal a notification, waiting of the human principal to indicate that the step has been performed, and then resuming execution of the flow control process. After termination of a step, output signals from the step are converted into input event signals for other steps in the work flow in accordance with "arc" data stored in the flow description database.

In addition, log records are durably stored upon instantiation, execution and termination of each step of a work flow, and output event signals are also logged, thereby durably storing sufficient data to recover a work flow with virtually no loss of the work that was accomplished prior to a system failure.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
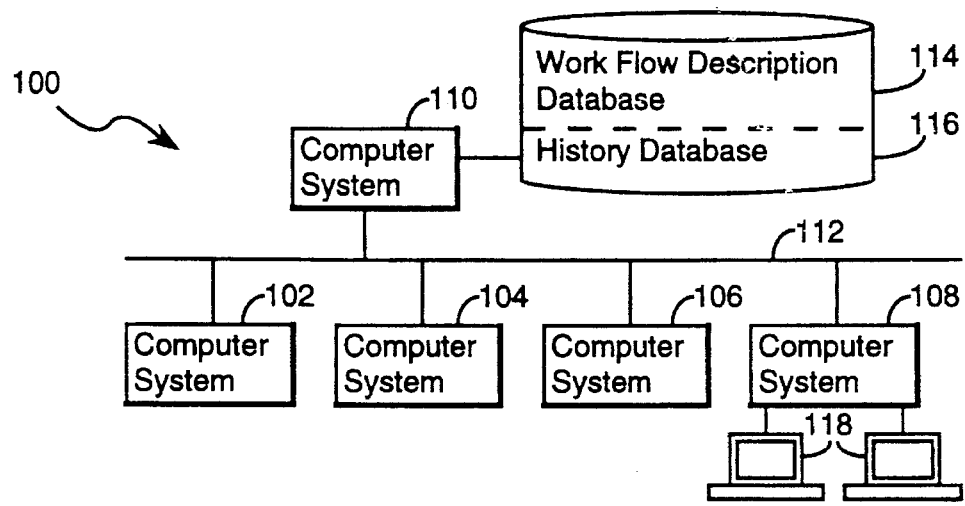
FIG. 1 is a block diagram of a distributed computer system used to perform work flows.

Referring to FIG. 1, the preferred embodiment of the present invention is a work flow management system and method that typically operates in the context of a distributed computer system 100 having a set of computers 102–110 interconnected by a local or wide area network 112 or some other communications medium. Each of these computers 102–110 is said to be located at a distinct node of the distributed computer system 100.

Each computer 102–110 contains standard computer system components, including a data processing unit, system bus, random access memory RAM, read only memory (ROM), mass storage (e.g., magnetic or optical disks), a user interface (e.g., keyboard, monitor and printer) and communications ports. These physical computer components (not shown) are not modified by the present invention and are therefore not described in detail herein.

At least one of the networked computers 110 is responsible for maintaining a work flow description database 114, and the same computer or another one in the system maintains a work flow history database 116. As will be described in detail below, the work flow description database 114 stores data representing each type of long running work flow that has been defined for the system. The history database 116 is essentially a log record database that can be inspected to determine the status of any ongoing work flows and to reconstruct ongoing work flows when recovering from a system failure.

Flow Management System Components

Figure 2:
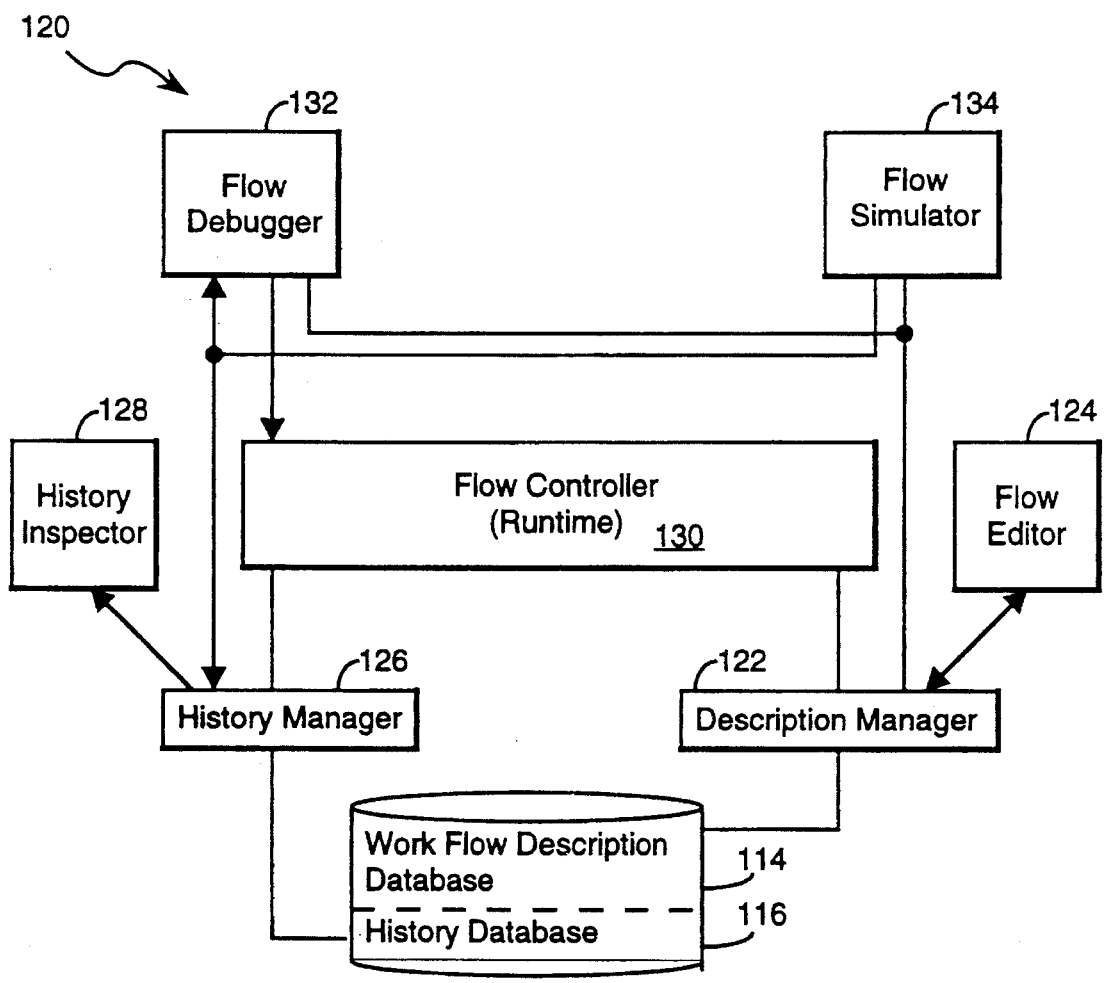
FIG. 2 is a block diagram of the primary software components of a work flow processing system.

Referring to FIG. 2, the preferred embodiment of the invention uses a flow management system 120, consisting of a set of software modules, to control the execution of work flows. A description manager module 122 is responsible for storing data representing each type of work flow in the work flow description database 114. The description manager module 122 and the structure of the work flow description database 114 will be described in detail below with reference to FIGS. 3–5.

In the preferred embodiment, a flow editor module 124 provides a graphic interface to facilitate the process of defining work flows. However, standard database editing tools can be used to define work flows in accordance with the present invention.

A history manager module 126 is responsible for storing log records generated during the execution of work flows. The log records are defined and stored so that it is possible to determine the status of each step of each executing work flow. In fact, the log records used in the preferred embodiment allow one to determine the exact point of execution of each step of a work flow and are sufficient to allow restarting each such step at various mid-step stages in the case of a system failure and recovery. A history inspector module 128 provides a user interface for checking on the status of executing work flows. The log records also allow review of completed work flows. The format of the log records used in the preferred embodiment, and linkages between log records used to help determine the current status of each work flow is discussed below with reference to FIGS. 19–21 in the section entitled "Log Record Database and System Failure Recovery".

A flow controller 130 is the main engine of the preferred embodiment. It controls the execution of each work flow, including the creation of new instances of predefined long term work flows, handling the transmission of messages between steps of the work flows, durably storing the results of each step, creating log records used for system crash recovery and status monitoring, and so on. The flow controller 130 and its underlying data structures are discussed extensively below.

A flow debugger 132 and flow simulator 134 are software modules used during the process of defining work flows to assist the programmer while checking and debugging the defined work flows.

Components of a Work flow

Figure 3:
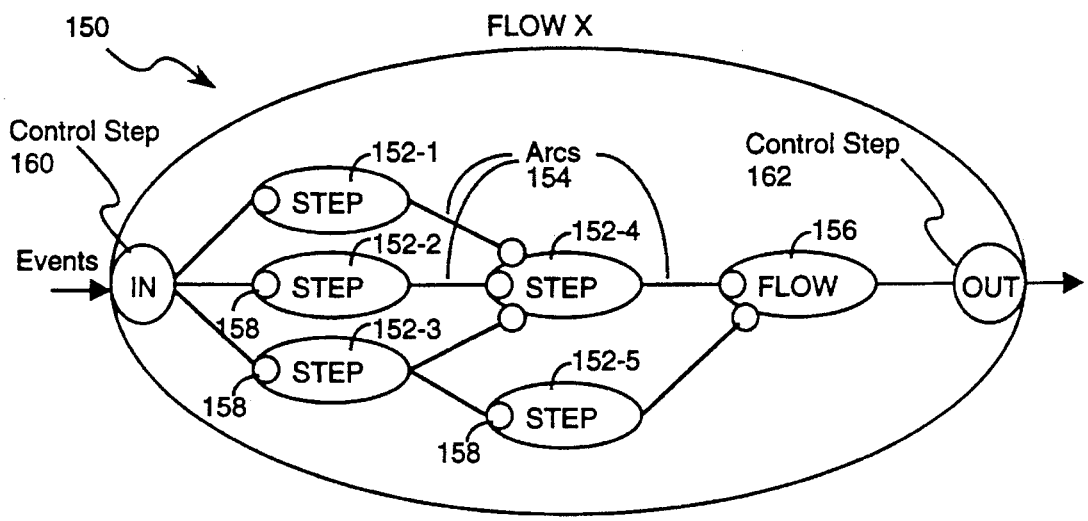
FIG. 3 schematically depicts a work flow.

Referring to FIG. 3, each type of work flow is modelled as a "flow" 150. A flow 150 comprises a set of steps 152 interconnected by data signal paths 154 called arcs. A flow 150 can contain sub-flows 156, which means that flows can be nested. Each step 152 of the work flow has input ports 158 and usually has at least one output port. Furthermore, the flow 150 has special input and output control steps 160 and 162 for mapping input events and output events between the flow 150 and the external world.

While the set of arcs 154 shown in FIG. 3 are very simple, it should be understood that the data path linkages between steps in some circumstances may be very complex and may even include loops or feedback paths for situations in which a set of steps may be reiterated under specified conditions (see discussion below of input and output conditions).

When defining any long term activity or work flow using the preferred embodiment, there is a fair amount of latitude as to how much work should be included in each step 152. This is a matter of programming choice on the part of the person defining the work flow. The general criteria are that each step (1) should perform a unit of work that is useful and worth saving should the overall work flow fail mid-stream, and (2) should be sufficiently short in duration that it does not tie up system resources for an extended period of time. There must also be clear criteria for when each step 152 or subflow 156 is ready to begin execution, what inputs it needs and where those inputs come from, and where its outputs should be sent.

As shown in FIG. 3, a work flow can include parallel work flow paths. It is beneficial to define work flows with parallel paths whenever steps do not need to be performed sequentially because the parallel paths may be performed simultaneously if there are sufficient resources (e.g., persons and/or processors) available. This makes efficient use of resources and also may reduce the amount of time required to complete a work flow.

Figure 4:
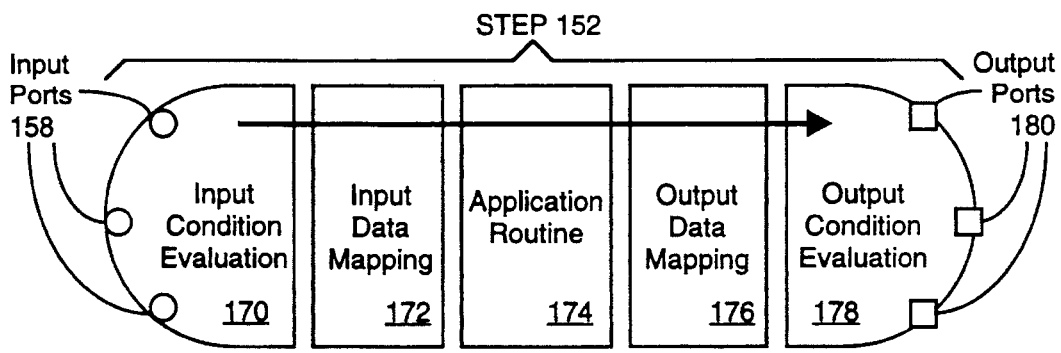
FIG. 4 is a block diagram of the components of a single step.

Referring to FIG. 4, each step 152 in a flow is modelled in the preferred embodiment as having several components, each of which performs a substep associated with the execution of that step. Input condition evaluation module 170 determines when enough input events have been received to require that an instance of the step 152 be created and executed. Input data mapping module 172 maps data received from input events into the order required for executing a specified application routine 174. Application routine 174 is the actual computation or notification routine that is performed by the step. The routine 174 can be complex or simple, as defined by the programmer setting up the work flow. Output data mapping module 176 maps output values from the application routine 174 into a specified order, and output condition evaluation module 178 issues output event messages through one or more output ports 180.

Work flow description database

Figure 5:
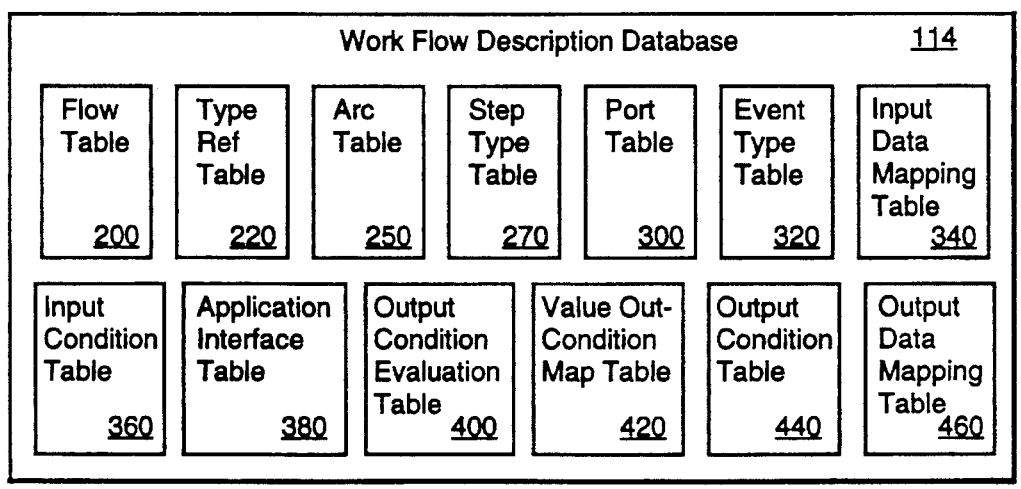
FIG. 5 is a block diagram of the primary tables used in a work flow description database.

Referring to FIGS. 2 and 5, a "model" of each type of work flow defined for a particular distributed computer system is stored in the form of a set of tables, herein called the work flow description database 114. In other words, all the relationships between the steps 152 of a work flow, as well as all other information needed to define and execute the work flow are stored in the form of a set of flat database tables.

The terms "step" and "work unit" are used interchangeably herein.

Conceptually, the data stored in the work flow description database can be used to specify business process schemas, somewhat like the schemas for a database. A business process schema specifies work units, conditions for instantiating each work unit, the application program used to execute the work unit, the format of the output signals or messages generated by the work unit and so on. The schema also represents work flows by specifying the connections between work units in terms of their order or execution, including specifications of conditions under which the order of execution varies, and the flow of messages and data between work units. The present invention provides a clear distinction between execution of individual work units, which is handled by application programs under the control of clients (i.e., processes running on computers in the system), and controlling what happens between the execution of work units, which is handled by the system's flow controller.

To understand the following description, it is important to distinguish between a "Flow Type" and an instance of that Flow Type. A Flow Type represents a type of work flow that may be performed many times. Each time that Flow Type is invoked, an instance of that Flow Type is generated in the distributed computer system and it is the performance of that flow instance which is tracked. Similarly, a Step Type is a model of a particular step, while a step instance represents one step of that Step Type in a flow.

Figure 6:
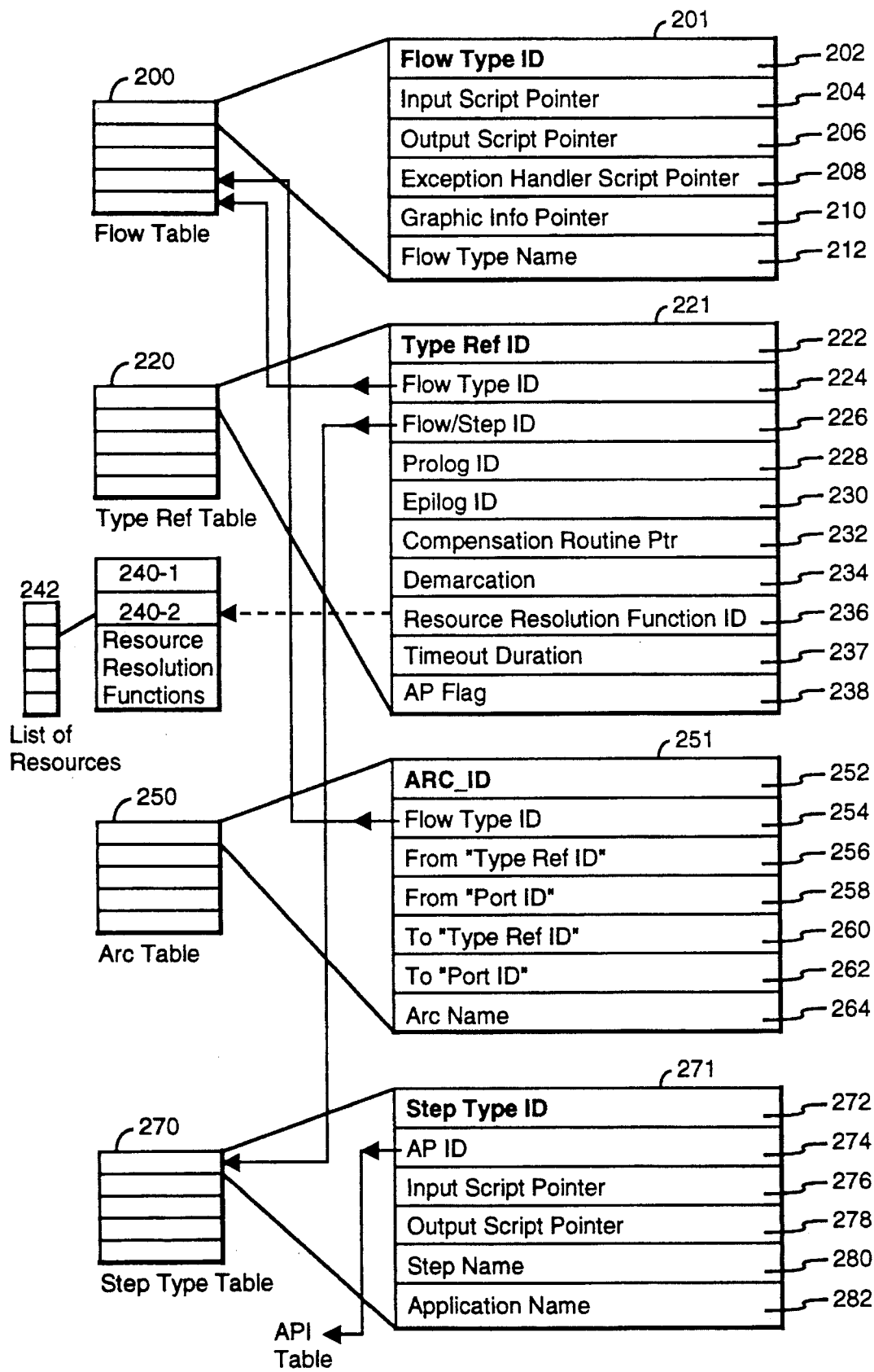
FIGS. 6 and 7 depicts some of the data structures of records in the tables in a work flow description database.

Flow Table. Referring to FIG. 6, the flow table 200 contains one record 201 for each defined Flow Type. The flow table records each contain a Flow Type ID 202 that is a unique value assigned to each Flow Type, an input script pointer 204 that points to a text string regarding inputs to flows of this Flow Type, an output script pointer 206, an exception handler script pointer 208, a graphic information pointer 210 that points to a file of graphic information used when displaying a representation of the flow, and a Flow Type Name 212 that is a text string containing the name of the flow as shown to system users and programmers. The script pointers 204, 206 and 208 all point to records in a "script" table, each record of which contains a text string containing descriptive text.

Type Ref Table. The Type Ref Table 220 contains a record 221 for every step and flow element in each Flow Type. The Type Ref records each contain a Type Ref ID 222 that is a unique value assigned to each flow and step element if the defined Flow Types, a Flow Type ID 224, which is a pointer (sometimes called a foreign key) to a corresponding record in the flow table 200 for this flow, a flow/step ID 226 that points to a record in the Step Type table corresponding to a particular step, a Prolog ID 228, and Epilog ID 230, a compensation routine pointer 232, a demarcation value 234, a Resource Resoluion function ID 236, Timeout Duration 237, and an application flag 238. The Demarcation value 234 indicates whether a step is at the beginning, end or intermediate position within a flow.

The compensation routine pointer 232 references a "compensation routine" that can be called when an exception (such as a timeout) occurs during the execution of a step or flow. Thus, each type of step can have a customized compensation procedure. Typically, when any step in a flow fails to execute, resulting in a decision to abandon the work flow, the compensation routine for the step that failed is executed, and then the compensation routines for all of steps of the flow that were previously executed are run, but in the reverse order of the steps. The chain of steps already executed in the flow is determined from the Log records maintained by the system, as will be described later. Compensation routines are thus used to "clean up" after a work flow or flow is aborted. In the preferred embodiment, the use of the compensation routines is not automatic, but is made by a human system operator (e.g., after the operator tries, but fails, to restart execution of the work flow).

The Resource Resolution Function ID 236 points, directly or indirectly, to a software routine called a Resource Resolution Function 240 that selects a "resource" (i.e., computer or other agent, such as a selected person) to execute the step. Resources are sometimes herein called "principals". Each time that a step is instantiated, the flow controller calls the specified Resource Resolution Function to select one resource or principal from a list 242 of defined resources to execute the step instance. Thus the resource to be used to execute each instantiated step is dynamically selected at the time of execution. The system may include many resource resolution functions, each using different criteria for selecting the resource to be used to execute a particular instance. In some cases, the resource will be selected to be the same resource previously selected to execute an earlier step in the long running work flow. Other criteria for selecting a resource may include the role played by the step, the "client" or "customer" for which a job is being performed, the history of the work flow up to this point, and so on.

For work flows in which a manager may want to assign certain work flow steps to particular individuals, the manager can record such work assignments in a predefined file. The resource resolution function used for selecting a principal to execute such work flow steps first consults the predefined file to see if an individual has been assigned to that step, in which case the specified individual is assigned that step. If no assignment is found in the file, a principal for the step is selected by the resource resolution function using a set of selection criteria, as discussed above.

The Timeout Duration 237 value indicates the maximum amount of time that should be allocated for execution of the associated flow or step.

The AP Flag 238 is true if the step associated with the record 221 executes an application program and is false if the step is just a control step that does not execute an application program.

It should be noted that FIGS. 6, 7, 8 and 9 represent the schemas of the primary tables used in the work flow description database to represent each defined type of work flow.

Arc Table. The Arc Table 250 contains records 251 that provide information for each data path within a flow. Each record has a unique ARC ID 252 for each arc in the Flow Type, a Flow Type ID 254 indicating the Flow Type in which the arc is found, a "From Type Ref ID" 256 and "From Port ID" 258 that specify the type of component and port from which data signals are received by the arc, and a "To Type Ref ID" 260 and "To Port ID" 262 that specify the type of component and port to which the data signals are sent. Arc Name 264 is a label or text string name given to the arc, typically having a value such as "Flow_X_Arc_21".

Step Type Table. The Step Type Table 270 contains one record 271 for each step in each of the defined Flow Types. The Step Type table record 271 is assigned a unique Step Type ID 272, an Application ID 274 that identifies the application program, if any, executed by this step, Input and Output Script Pointers 276 and 278, a Step Name 280 that is a text string name given to the step, and an Application Name 282 that is a text string identifying the name of the application program executed by this step, if any.

Figure 7:
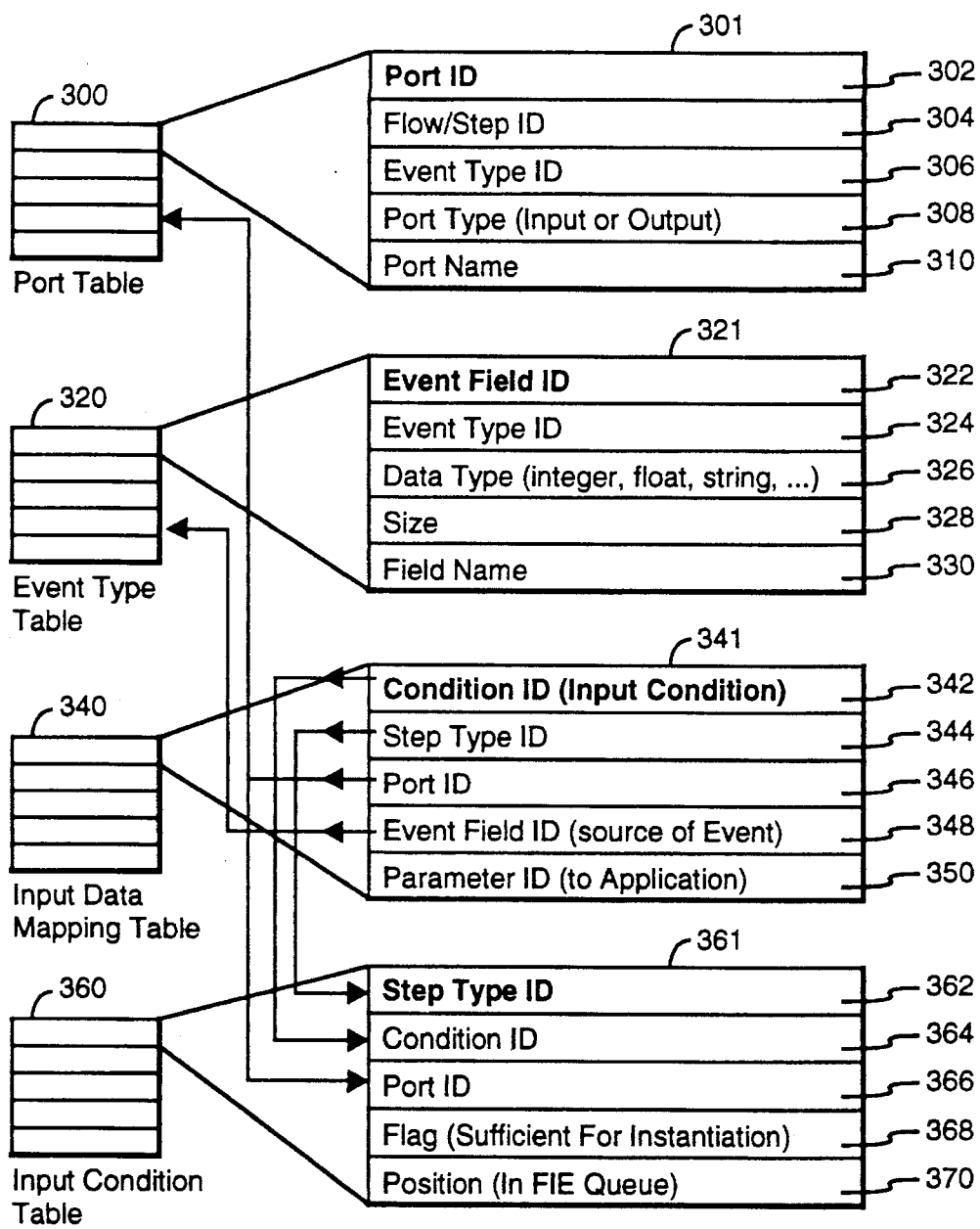

Port Table. Referring to FIG. 7, the Port Table 300 defines each of the input and output ports for each step in each defined flow. A Port Table record 301 for one port has a unique Port ID 302, a Flow/Step ID 304 that identifies the Flow or Step for which a port is being defined, an Event Type ID 306 that references a record 321 in the Event Type Table 320 (discussed below), a Port Type 308 that defines whether the port is an input or output port, and a Port Name 310 that is a text string name given to the port, such as "Output Port A" or "Q1".

Input Conditions and Input Data Mapping

Conceptually, an "event" is the occurrence of something that generates a data signal. For the purposes of this document, an event signal (often called "an event") is a data signal representing an event.

The purpose of an input condition is to specify one or more sets of input event signals that are sufficient to initiate execution of each type of step defined in the work flow description database. A particular flow or Step Type may have multiple input conditions, each specifying a different combination of input event signals. When the flow controller receives input event signals that match any input condition for a particular Step Type, an instance of that step is created and scheduled for execution. The process of creating a step instance is called "instantiation" or "instantiating a step".

The purpose of the Port, Event Type, Input Data Mapping, Input Condition and API tables 300, 320, 340, 360 and 380 is to provide a flexible mechanism for defining input conditions for each Step Type and also for mapping data contained in event signals into the parameters needed by the application program executed by each Step Type.

Event Type Table. Each type of event has an associated format or template for the data conveyed by the event, and the Event Type Table 320 defines the format of each type of event signal. Each event type record 321 defines one data field of an event signal and has a unique Event Field ID 322 as well as an Event Type ID 324 that identifies the type of event for which a field is being defined. For instance, an event signal with two data fields would have two records in the Event Type Table 320. The record 321 also has a Data Type value 326, indicating whether the data in this field is an integer, floating point number, string, and so on. The Size 328 indicates the amount of storage occupied by the field, and Field Name 330 is a text string of the name of the field.

Input Data Mapping Table. The purpose of the Input Data Mapping Table 340 is to specify what input event signals are to be mapped into each of the parameters needed by a step's application program. Each record 341 of the table 340 represents one input event that can be received by a particular step, and includes a Condition ID 342, which is discussed below, a Step Type ID 344 that identifies the step that receives the event signal, a Port ID 346 that identifies the Port at which the event signal is received, an Event Field ID 348 that defines the format of the event signal by referencing one of the records in the Event Type Table 320, and a Parameter ID 350 that identifies the parameter in the application program whose value is to be provided by the event signal.

Input Condition Table. The Input Condition Table 360 specifies when the right combination of event signals has been received to initiate execution of a step in a work flow. As explained above, for any one step it is possible to have two or more input conditions. Each input condition is the logical conjunction of one or more input ports, meaning that the input condition is satisfied when event signals are received on all of the ports specified by that input condition. Satisfying any one input condition is sufficient for instantiating the step.

The Input Condition Table 360 has a set of records for each input condition of each step. Each record 361 contains the Step ID 362 of the step to which it pertains, a Condition ID 364 that identifies a particular input condition, a Port ID 366 that identifies the port on which an event signal may be received, a Flag value 368 and a Position value 370. The records in the Input Condition Table are ordered so that all the records 361 for one Step ID are clustered together, with all the records for each input condition of the step clustered together and ordered so that the Position value 370 increases in value within the cluster of records for each input condition. The Flag value 368 is equal to "Yes" only for records corresponding to the last input event signal for a particular input condition, and otherwise is equal to "No". Thus Flag 368 is equal to "Yes" only when the corresponding set of input signals is necessary and sufficient for instantiation.

Figure 8:
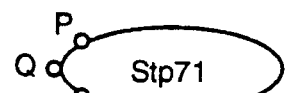
FIG. 8 is a block diagram of a set of input condition table entries representing alternate input conditions for instantiating a particular step.
Figure 9:
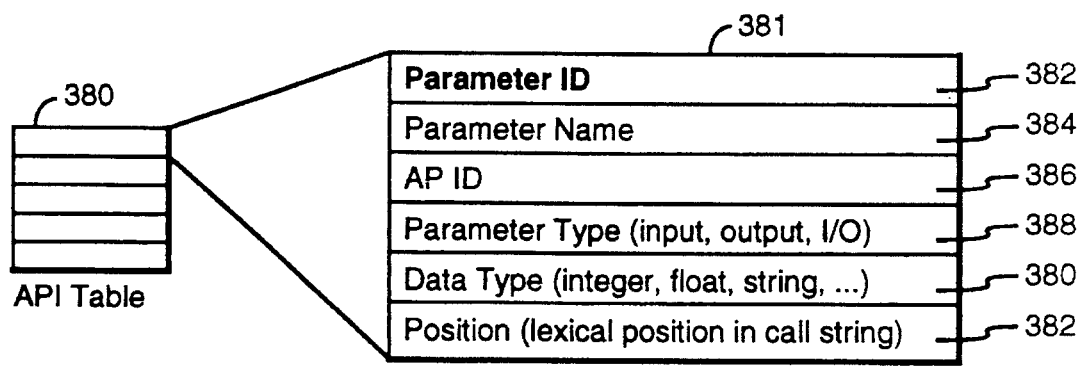
FIG. 9 depicts the data structure of an application parameter identification table in the work flow description database of the preferred embodiment.

Referring to FIG. 8, the use of the Input Condition Table 360 is most easily explained by example. Consider a step Stp71 having three input ports P, Q and R and two input conditions C1 and C2. Input condition C1 is "P and Q" and input condition C2 is "Q and R". This means that if event signals are received on ports P and Q, or on ports Q and R, the step Stp71 will be instantiated. As will be explained below, all event signals in the distributed computer system are stored in a queue called the FIE (flow input event) queue. The events in that queue are sorted by the Step ID for the step to which the event signal is being sent, and then by input Port ID. The Flag 368 and Position 370 values are simply a convenient method of keeping track of the number of input event signals that must be received to satisfy each input condition.

API Table. The purpose of the API (application parameter input) Table 380 is to define each of the input and output parameters associated with an application program. Each row 381 of the table 380 defines one parameter for one application program. The components of each row 381 are a unique parameter ID 382 and parameter name 384 for the parameter being defined, the Application ID 386 for the application program associated with the defined parameter, a parameter type 388 (i.e., input, output, or input/output), a data type specifier 390 indicating whether the parameter is an integer, floating point numbers, and so on, and a position value 392 indicating the position of the parameter in the call string for the application program.

Output Condition Evaluation and Output Data Mapping

The basic concept concerning output data mapping is as follows. While many steps (i.e., application programs) will output the same set of event signals (e.g., event signals on output ports Q1 and Q2) every time they are run, for some steps it is important to be able to generate different sets of output event signals depending on some control parameter. Each distinct value of the control parameter is called an output condition, and a corresponding specified set of output event signals is generated.

Figure 10:
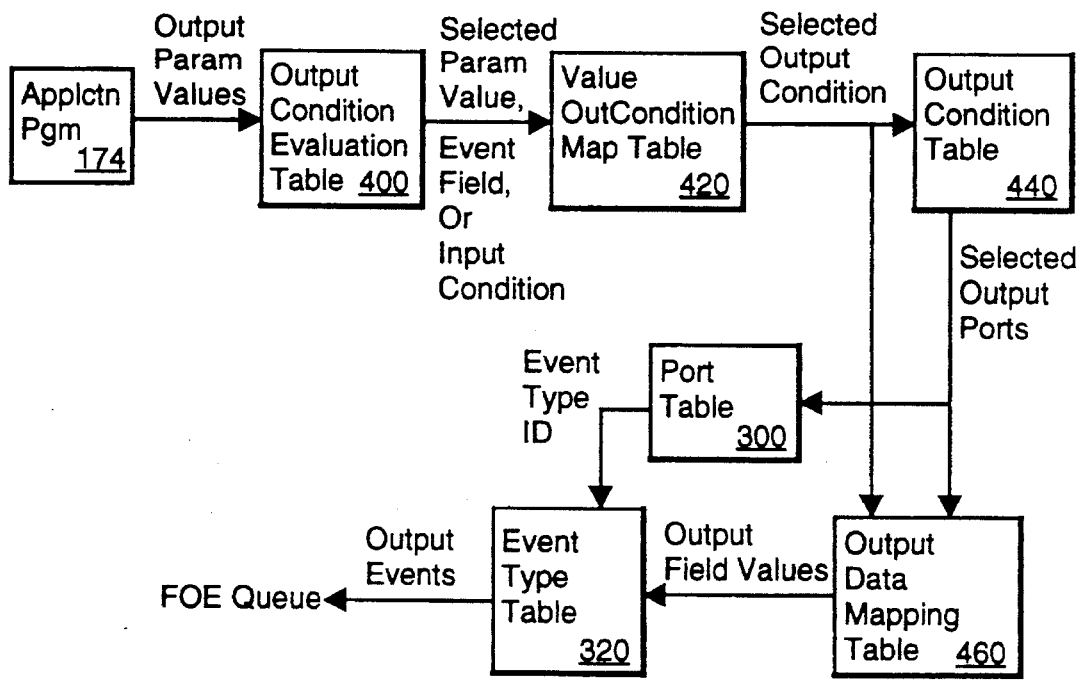
FIG. 10 is a flow diagram of the process for mapping output parameters generated by an application program into a set of output event signals.
Figure 11:
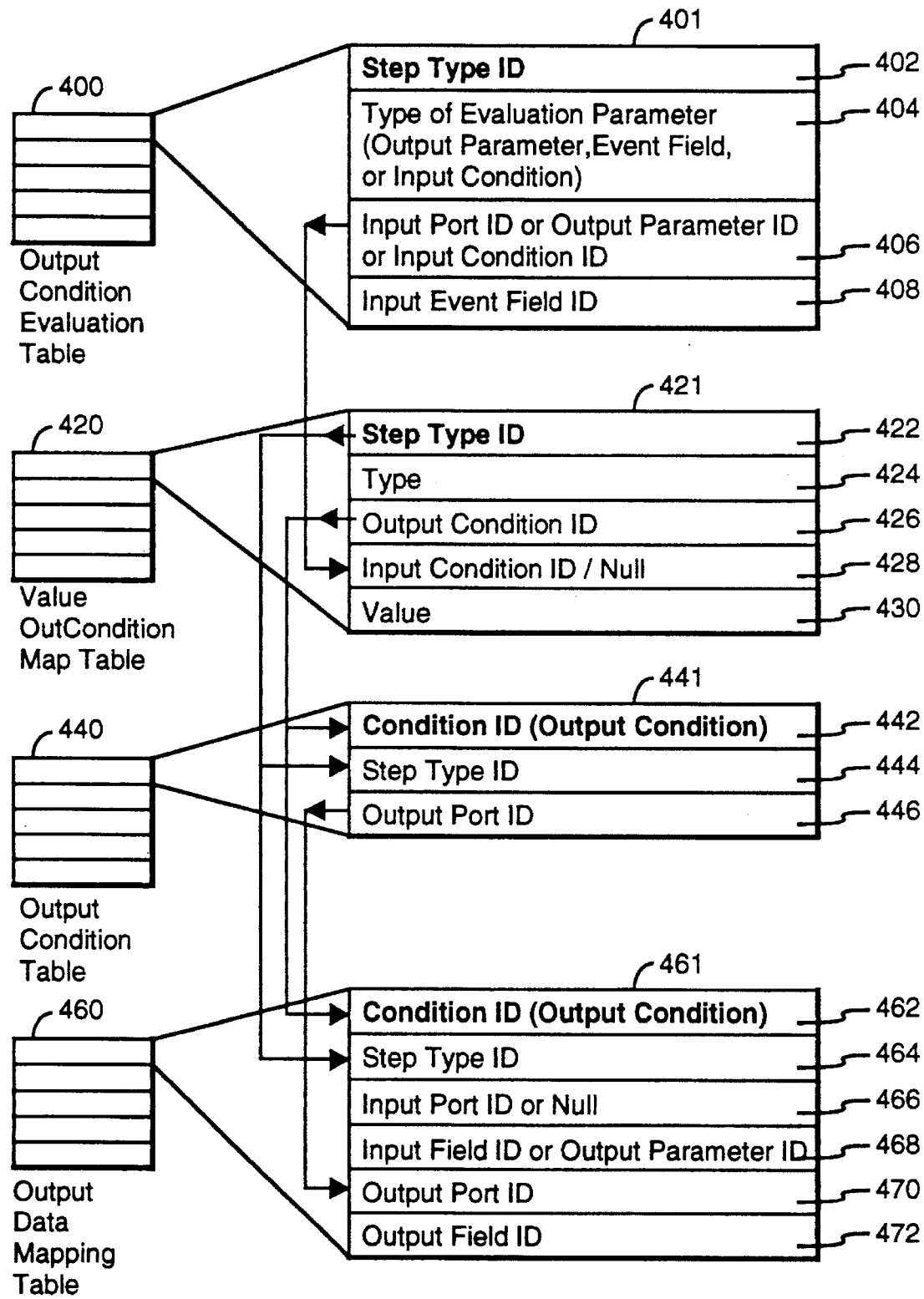
FIG. 11 depicts the data structures of tables in the work flow description database of the preferred embodiment used for mapping output parameters.

Referring to FIGS. 10 and 11, in the preferred embodiment, an Output Condition Evaluation Table 400 specifies for each program what the control parameter is that will govern the selection of output event signals. Table 400 has one record 401 for each Step Type, specifying a Step Type ID 402, and a Type value 404 that indicates whether the control parameter is an output parameter generated by the application program, an input event field, or the input condition that resulted in instantiation of the step. Two other parameters 406 and 408 denote an output parameter ID, an input port and input event field, or an input condition ID, depending on the Type value 404.

Next the information obtained from the Output Condition Evaluation Table 400 is used to search the Value OutCondition Map Table 420 to select the output condition to be used. The Value OutCondition Map Table 420 contains one record 421 for each output condition associated with each Step Type. For a given Step Type, the Step Type ID 422 and Type value 424 in Table 420 are the same as in Table 400. Each record 421 for a given Step Type has a different Output Condition ID 426, with one such record 421 being selected by matching either the Input Condition ID field 428 with the step's instantiation input condition, or by matching the Value field 430 with the value of a specified output parameter or input event field. The end result of using tables 400 and 420 is the selection of an Output Condition ID.

The Output Condition Table 440 contains, for each distinct Output Condition ID of a given Step Type, one record 441 for each output port on which an output event signal is to be generated. Thus, each record 441 contains an Output Condition ID 442, a Step Type 444 and an Output Port ID 446. For instance, for a given Step Type, output ports Q1 and Q2 might be used when Output Condition OC1 is selected, while output ports Q2 and Q3 might be used when Output Condition OC2 is selected. In this example, there would be four Output Condition Table records 441 for this Step Type.

The purpose of the Output Data Mapping Table 460 is to specify the source of the information that is to be put in each data field of the output event signals. It should be noted that it is possible to have an event that has no data fields. Such event signals are useful because they indicate that a particular step of a work flow has been completed. In any case, Table 460 has one record 461 for each data field of each output event associated with the selected output condition. Each record 461 contains a condition ID 462 and Step Type ID 464 specifying the Step Type and output condition to which the record applies. The source of the data for one output event field is specified either by an input port ID 464 and input field ID 468 or by an output parameter ID (also stored in field 468), and the corresponding output event field is specified by an output port ID 470 and output field ID 472.

Note that once the selected output condition ID and the set of output port IDs is known, the Port Table 300 is used to look up the Event Type ID for each of the output event signals that needs to be generated, and then those Event Type IDs are used to look up in the Event Type Table 320 the data type and size of each data field in the output events to be generated.

Loop as Optional Output Condition

In some contexts a set of one or more steps may need to be repeated. In the example work flow 470 shown in FIG.

12, the role of step 472 is to review work performed by earlier steps 152-1 to 152-5 in the flow, and to decide whether the job is ready to progress to step 474 or, instead, should be sent back to step 476. For instance, the steps 476 and 152-1 to 152-5 shown in FIG. 12 might be tasks associated with repairing a particular type of machine, and step 472 might represent a quality review that is performed before passing the job onto some subsequent step (such as notifying the customer that the machine has been repaired).

Figure 12:
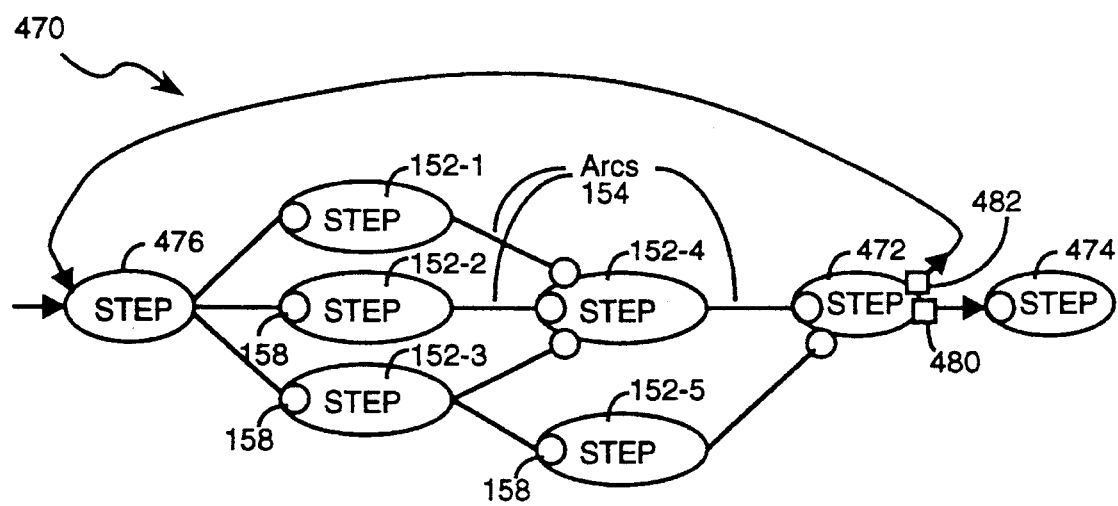
FIG. 12 schematically represents a flow in which a set of steps may be repeated.

The optional loop path shown in FIG. 12 is easily implemented using the output condition definitions described above. In particular, step 472 would be defined to have two output conditions, with the output condition being selected based on an output parameter generated by step 472. Thus, referring to FIG. 11, the record 401 in the Output Condition Evaluation Table 400 associated with step 472 would specify in field 404 that the type of evaluation parameter is an output parameter, and field 406 would specify the particular output parameter to be used (e.g., an output parameter called "Quality"). The Value OutCondition Map Table would have two records associated with step 472, for example, one record specifying that a value of Quality=1 is associated first a first Output Condition ID and a second record specifying that any other value of Quality is associated with a second Output Condition ID. The Output Condition Table 440 specifies the output port 480 or 482 to be used for each of these two Output Condition IDs. Finally, the Output Data Mapping Table 460 specifies the contents of each field in the two types of output event signals that can be generated.

Flow Controller

To summarize, the above description shows how a work flow can be broken down into component parts, herein called steps and flows, and also shows how a complete description of the steps (work units) to be performed by the work flow and the data flows between the steps can be stored in a set of database tables.

It should be understood that the data stored in the work flow description database 114 represents a set of "work flow types" or "activity types", each of which is essential a template that can be used an unlimited number of times. For instance, assume that one type of work flow is the automated assembly of an engine under the control Of a computer or set of computers. The steps and flows associated with that work flow type would be stored in the work flow description database 114. Each time that the process of assembling an additional engine is started, a new instance of this work flow type will be created in the control computer. Thus, it is quite possible for dozens, hundreds or even thousands of instances of a particular work flow type to be executing, or at least be in process, simultaneously in a computer system.

More particularly, whenever a new work flow is started, one instance of the initial steps of the work flow are created and executed. Each step and flow downstream from the initial steps are created or instantiated only when a sufficient set of input event signals are present. Each instance of a flow is identified by a unique Flow Instance ID as well as its Flow Type ID. Each instance of a step is identified by a unique Step Instance ID as well as its Step Type ID.

The following is an explanation of how the actual execution of a work flow is handled.

Figure 13:
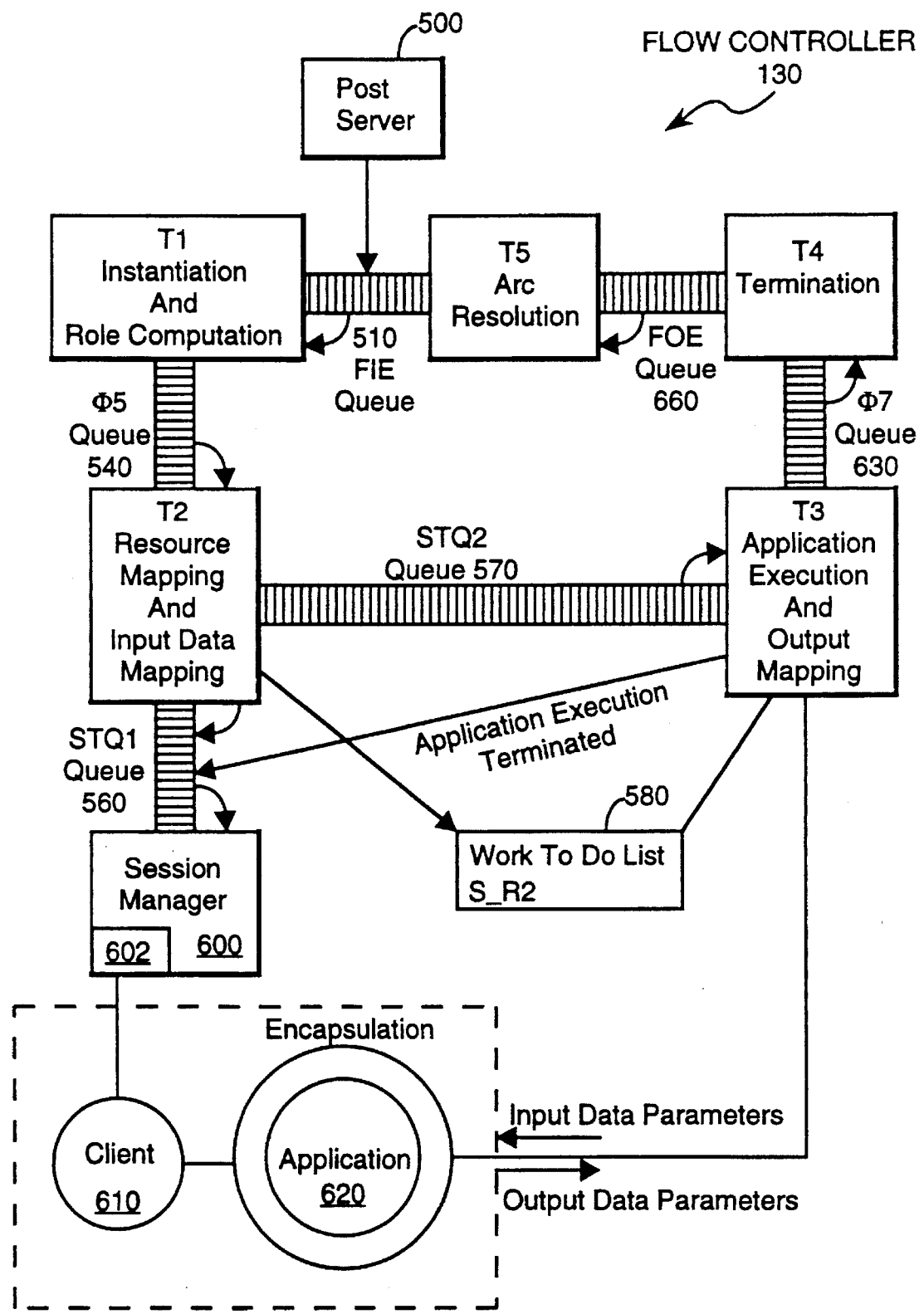
FIG. 13 is a block diagram of a flow management system, representing the processes and data structures used in the preferred embodiment to control instantiation and execution of the steps of a work flow.

FIG. 13 represents the components of the flow controller 130. The flow controller 130 uses five processes T1 through T5 to control the handling of each step in a work flow. Each of these processes has a corresponding input queue. FIGS. 14 through 19 show the data structures of these queues. The FIE queue stores input data events. Input data events include both event signals generated by previously executed steps and externally originated event signals. Externally originated event signals, typically representing a request to start a new work flow, are inserted into the FIE queue by a process called the Post Server 500.

An important aspect of the flow controller 130 is that the number of concurrently running processes associated with the flow controller 130 remains constant, regardless of the number of work flows that are executing at any one time. As will be explained below, each flow and step instance is assigned by the flow controller to a particular system resource (typically one of the system's processors) for execution. The flow controller's job is to coordinate the execution of work flow steps and the data flows therebetween, but the actual execution of each step is handled elsewhere. By using this division of work, the flow controller 130 is "scaleable" in that it is capable of handling a very wide range of work loads. To scale up a system to handle large numbers of work flows, the system manager needs only to increase the number of processors to which the flow controller can assign work. The number of steps or application programs simultaneously executing in the system on the system's various processors will depend on both the number of work flows currently executing and the amount of computing power available to service those work flows.

Figure 14:
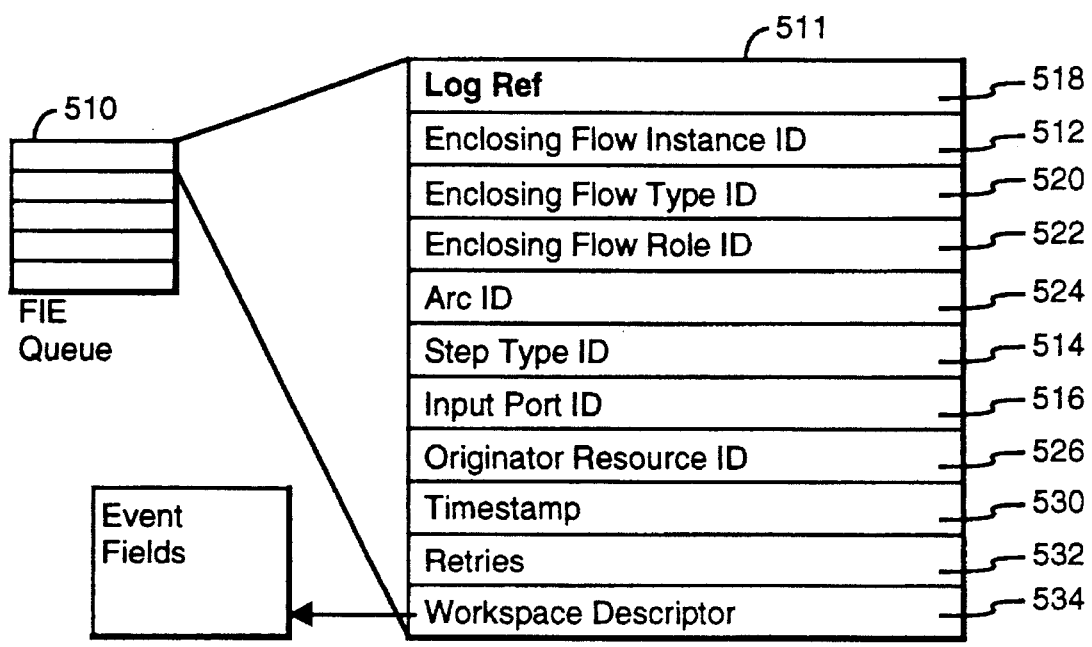
FIGS. 14, 15, 16, 17, 18 and 19 resent the data structures of queues used by the flow management system of FIG. 13 to represent input and output event signals and to represent steps in the process of being executed.

Process T1. Process T1 creates new instances of flows and steps whenever the event signals in the FIE queue 510 are sufficient to meet the input conditions specified for the corresponding Flow Type or Step Type. As discussed above with reference to FIGS. 7 and 8, whenever the event signals waiting in the FIE queue satisfies a Step Type's input condition, an instance of that Step Type is created. Referring to FIG. 14, each input event signal 511 in the FIE queue 510 specifies the enclosing Flow Instance 512 in which the arc for the signal is located, as well as the Step Type 514 and the Port ID 516 of that Step Type to which the input event signal is directed.

Other information in each input event signal 511 includes a Log Ref 518 field that is a pointer to a corresponding log record, the enclosing flow's Flow Type 520 and Flow Resource 522, and the Arc ID 524 of the arc that connects the step that generated the event signal and the step to which the event signal is being sent. Also in the event signal are Resource data 526 regarding the step that generated the event signal, a Timestamp 530 indicating when the event was generated, a Retries parameter 532 indicating the number of times the system has tried to convert an FOE record into the FIE record, and a Workspace Descriptor 532 that points to an area of memory in which all the data fields of the event signal are stored.

When the T1 process "creates an instance" of a step by assigning a new Step Instance ID and storing a new record 541 in the Φ5 queue 540. In essence, the new step instance exists at this point only as a new record 541 in the Φ5 queue 540.

Figure 15:
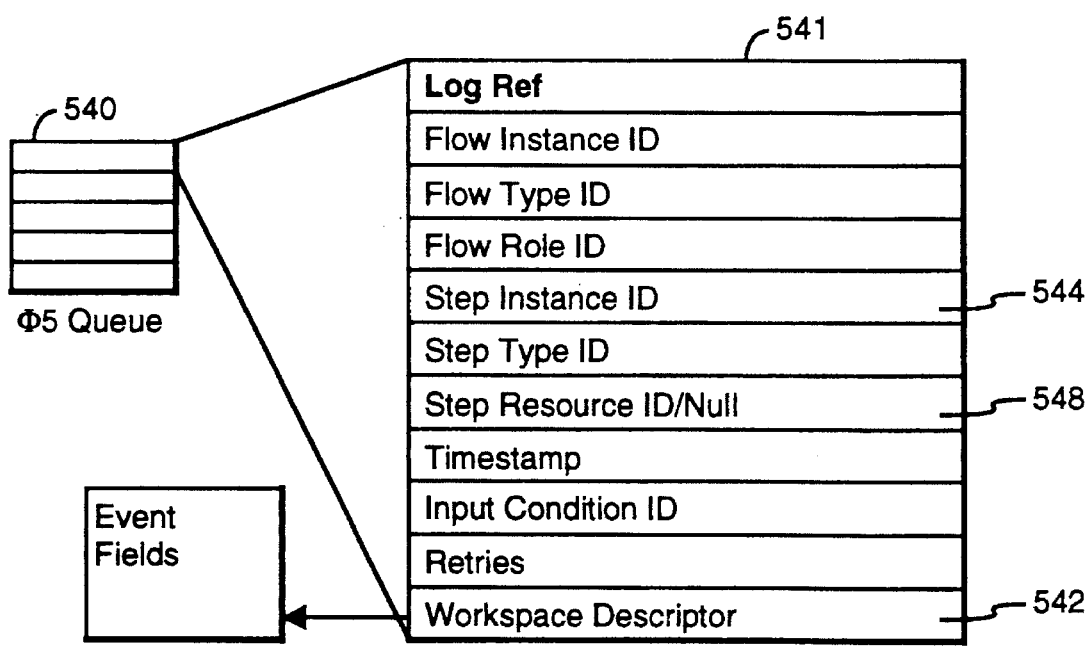

As shown in FIG. 15, several fields of the Φ5 queue records 541 are the same as in the FIE queue records. Note that the specified Flow Instance ID, Flow Type ID and Flow Resource ID correspond to the flow instance in which the created step instance is located. If the step instance is an input control step, the T1 process first allocates a new Flow Instance ID, and a corresponding log record, before generating the Φ5 queue records 541.

Since several event signals may be used to create one new step instance, the event data fields pointed to by workspace descriptor 542 in Φ5 queue record 541 may contain data from several input events. The new information in each Φ5 queue record 541 includes the Step Instance ID 544, and a Step Resource ID 548 that identifies the computer, machine or person to which execution of the step has been assigned. The Step Resource ID 548 is selected using the resource resolution function references by the Type Ref Table 220 (see FIG. 6) for the specified Step Type.

Process T2. Process T2 performs input data mapping and resource mapping. Neither input data mapping nor resource mapping is performed by input and output control steps.

Resource allocation is the process of determining the type or class of computer, machine or other principal that can execute a particular step or flow. Resource allocation is based on the resource resolution function ID for the step or flow, as specified in the Type Ref Table.

Figure 16:
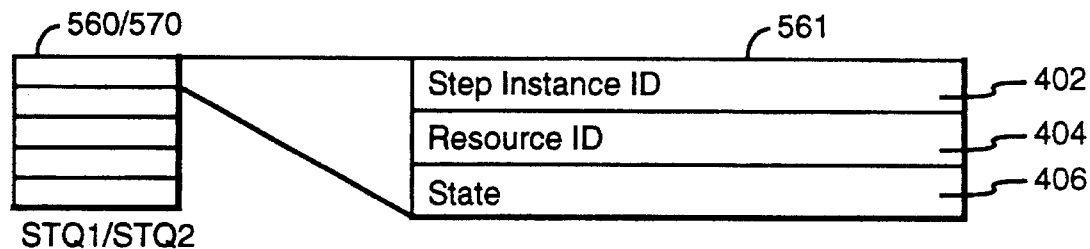

For both input and output control steps, the T2 puts a small record in the STQ2 570 queue indicating that the control step is ready for processing by the T3 process. The T2 process also adds a record for the control step to the S_R2 Work To Do List 580. The data structures of the records in the STQ1 and STQ2 queues 560 and 570 is shown in FIG. 16.

Figure 17:
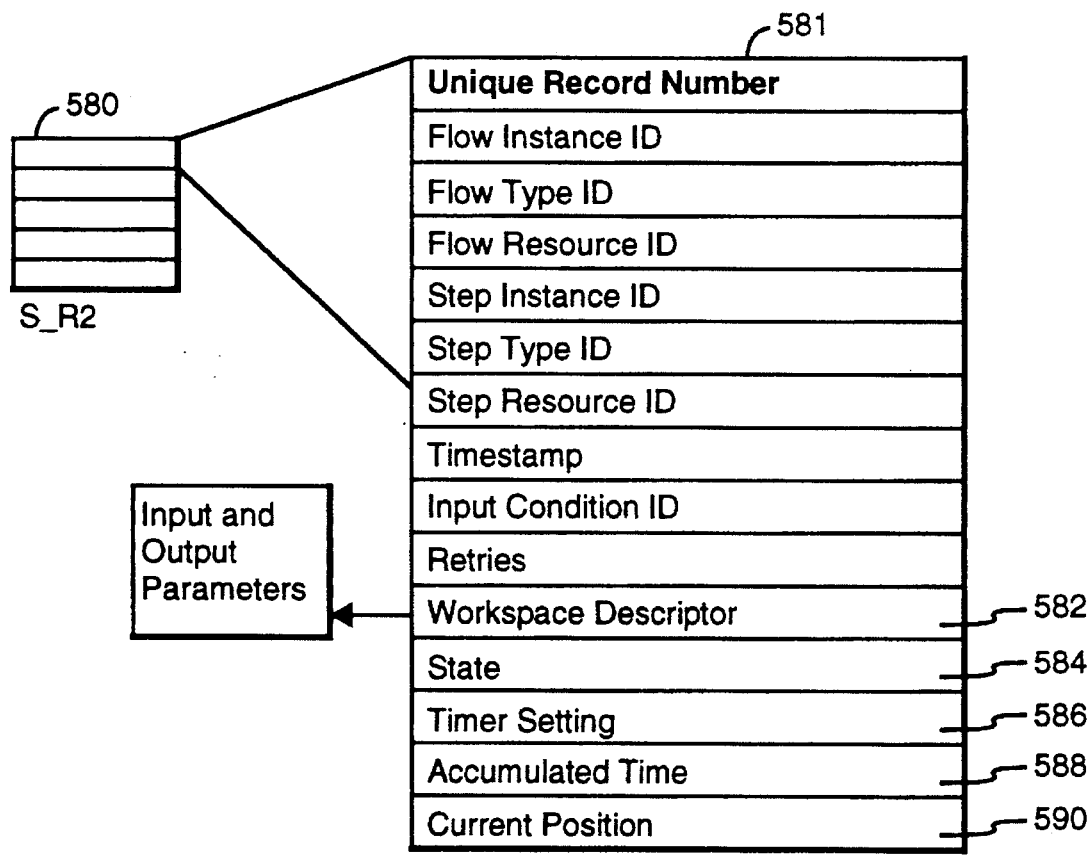

Output control steps require output data mapping, and the record added to the S_R2 list 580 for the control step notifies the T3 process that the control step is ready for processing. The data structure of records in the S_R2 list 580 are shown in FIG. 17. Note that the data structure of records in the S_R2 list are the same as the data structure for records in the Φ5 queue, with the addition of a State Field 584, Time Setting 586, Accumulated Time 588, and Current Position 590. The State Field 584 indicates the status of the step, such as "Waiting to Start", "Executing", or "Completed". When a step's S_R2 record indicates that its execution is completed, the process T3 takes over handling of that step. The Time Setting 584 is equal to the time at which the step will timeout if execution of the step is not yet complete, and is computed by the T2 process as the starting time for the step plus the Timeout Duration for the step.

For non-control steps, the T2 process performs input mapping and then puts a small record in the STQ1 queue 560 indicating that the step is ready for execution and processing by the T3 process. The T2 process also adds a record for each step to the S_R2 Work To Do List. The process for performing input data mapping was described above. The net result of the input data mapping process is a list of parameters sequenced in the order required for calling an application program. The mapped input data is stored in memory areas referenced by the Workspace Descriptor 582 of the S_R2 record.

A second function performed by the T2 process is monitoring timeout limits for each step and flow instance.

Session Manager, T3 Process and Application Execution. Referring to FIG. 13, the role of the session manager process 600 is to read items on the STQ1 queue 560, remove them from the queue 560 and add those items to a status list 602 stored internal to the session manager 600. Note that the items in the STQ1 queue 560 indicate the resource (i.e., computer) on which each step is to be executed. Client processes 610 running on various computers in the distributed system log onto the session manager 600 so as to obtain a list of all the items on the status list 602 that pertain to that client. When a client process 610 is ready to execute a new application program, it picks an item on list 602 (if there are any waiting for that process).

The client process then executes the application program 620 as follows. First the client calls the Application Manager process T3, passing it the Step Instance ID (obtained from the STQ1 queue record) for the step to be executed, and requests the process T3 to send it the list of input parameters for the application. The Application Manager process T3 finds the record in the S_R2 list 580 that corresponds to the specified Step Instance ID. Then it starts a "transaction" between the T3 process and the client 610 and sends the client the name of the application program to be run (obtained from the Step Type Table) and the input parameters for the application program (obtained from the record in the S_R2 list corresponding to the specified Step Instance ID). The client executes the application program and sends the resulting output parameters to the Application Manager process T3. Process T3 stores the output parameters in the workspace referenced by the Workspace Descriptor 582 in the S_R2 record for the step instance being executed and then terminates the transaction with the client process, durable storing the results of the step.

At this point, the Application Manager process T3 adds a record to the STQ1 queue 560 indicating that the application program's execution has been completed. The Session Manager 602 uses this information to update its internal list 602, i.e., to delete the record concerning that step instance from its internal list 602.

Next, the Application Manager process T3 performs output mapping, mapping input and output parameters for the step into the fields of the output event signals. The output mapping process was explained above with reference to FIG. 10.

Output control steps, which are the last step at the end of each flow, also undergo output mapping. Each output control step is represented by a record in the STQ2 queue as well as an item in the S_R2 list. These records are picked up by the Application Manager process T3, and the input signals to the control step are mapped into output signals using the workspace descriptor from the corresponding S_R2 record to locate the input signal data.

Figure 18:
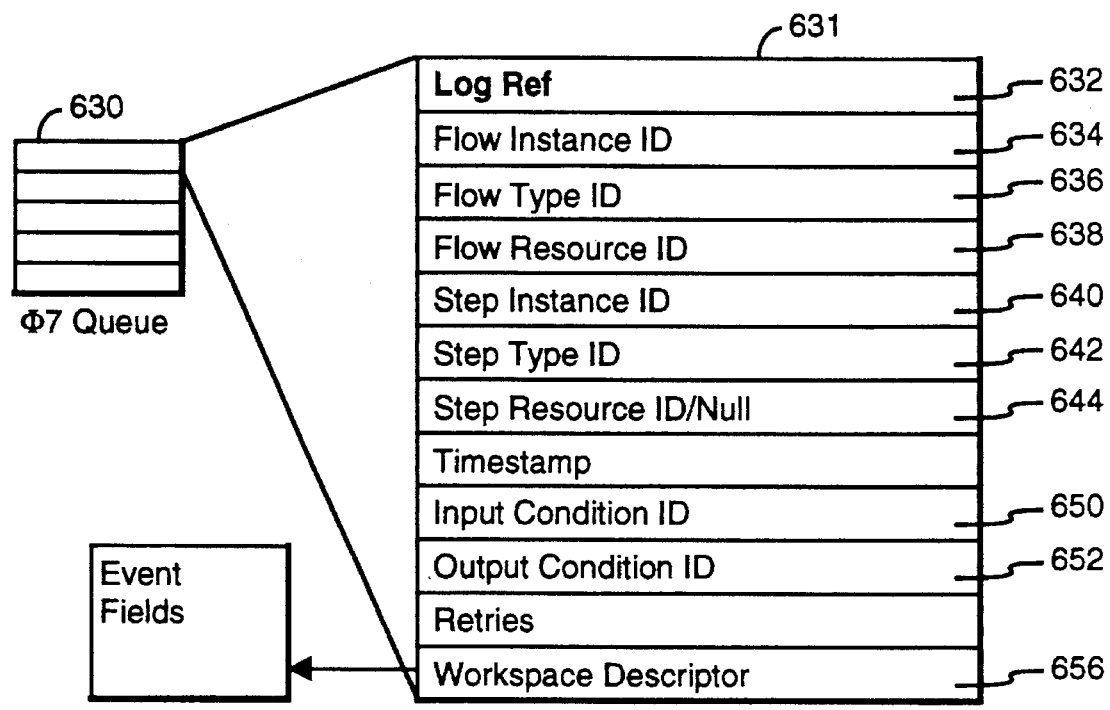

The Application Manager process T3 generates one record in the Φ7 queue 630 for executed step. The format of the Φ7 queue 630 is shown in FIG. 18. Each output event record has fields that identify the corresponding log record 632, flow instance 634–638 and step instance 640–644 that generated the output event, the input condition 650 that instantiated the step instance and the output condition 652 selected for output signal generation, plus a workspace descriptor 656 that points to an area of memory in which all the output event data fields associated with the step are stored.

Figure 19:
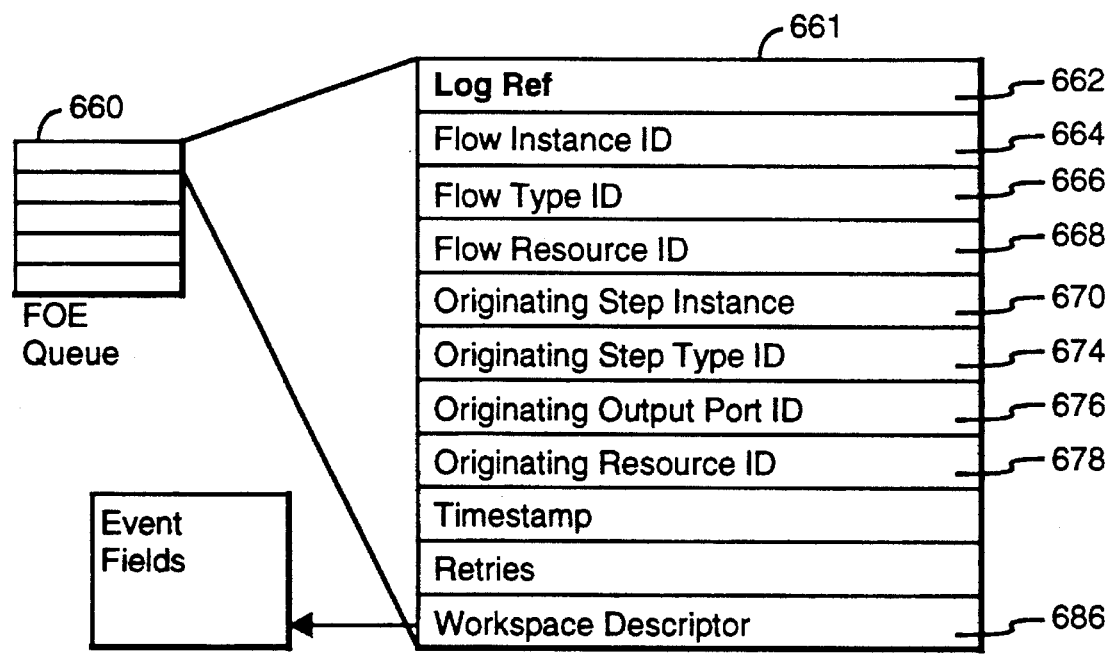

Next, the Step Termination Process T4 (see FIG. 13) generates a separate output event record in the FOE queue 660 for each output event signal. Step T4 also processes the log records for the step, which will be discussed below in the section of this document entitled "Log Record Database". The format of the FOE queue 660 is shown in FIG. 19. Each output event record has fields that identify the corresponding log record 662, flow instance 664–668 and originating step instance 670–678 that generated the output event, plus a workspace descriptor 686 that points to an area of memory in which the output event signal's data fields are stored.

Finally, the Arc Resolution process T5 looks at each record in the FOE queue 660, looks up the corresponding record in the Arc Table 250 (see FIG. 6), and then creates a corresponding FIE record in the FIE queue 510. The structure of the records in the FIE queue was discussed above with regard to FIG. 14. Note that for output control steps, whose output event signals will be sent to new flows that have not yet been generated, the T1 process generates a new Flow Instance ID to represent the new instance of the Flow Type specified in the Art Table 250.

Thus, we have now completed the entire cycle of processing the execution of a step. In a typical system, many steps from many different flows will be in process at the same time, and thus there can be many items in each of the queues at any one time waiting for processing. As each step works its way through the T1 to T5 loop, its records in the previous queue are deleted and new records are created in the next queue along the loop. Log records are generated by each of the processes T1 through T5 to allow recovery of steps interrupted by system failures. Log record generating and maintenance are discussed below.

It should be noted that the particular breakdown of operations between processes T1 through T5 represents only one possible embodiment of the invention. For instance, the T3 and T4 processes could easily be combined. However, the inventors found it desirable to close off and commit the step as quickly as possible. Therefore process T3 does as little work as possible to complete the step's execution and durably store its results, and then process T4 completes the process of generating output event signals.

Notification Steps

Referring to FIGS. 3 and 13, the steps 152 in a defined work flow may include both automated steps, automatically performed by a computer or other machine, as well as "manual" steps that are performed by or under the control of a person or other independent principal (i.e., a principal that is autonomous from the viewpoint of the flow controller). From this perspective, the purpose of the present invention is to coordinate the activities performed by a multiplicity of principals working jointly on a defined project. Depending on the particular application of the invention, "principals" may include a number of human agents, each of whom need to perform various defined tasks before the project can progress to the next stage, and may also include a number of computers and machines that perform defined tasks once the defined project reaches a specified point.

The types of defined projects involving human principals are tremendously varied. Examples include the process of manufacturing a car engine or a watch, or even the process of preparing and assembling an edition of a newspaper. The flow specification indicates both the order in which tasks (i.e., steps) need to be performed, and also specifies the type of principal required to executed each step.

Note that each entry in the Type Ref Table (see FIG. 6) includes a Resource Resolution Function ID 236 that points, directly or indirectly, to a software routine that selects a "resource" (i.e., computer or other agent, such as a selected person) to execute the step. When the Resource Resolution Function is selecting a human principal to perform a step, the selection criteria will typically specify a job title indicating the required capabilities of the person to be selected, as well as other criteria such as the person's existing work load or the person's relationship to the job being performed.

Referring to FIG. 13, the application program associated with "manual" steps to be performed by a human principal will typically have as its sole task sending notifications to a particular person, or to any available person who fits a specified "role" (e.g., a particular job title or description). Typically, the notification will state (A) that a particular job is ready to be worked on, and (B) that a particular command should be entered into the computer system when the person's work on the project is completed so that the project can progress to its next phase.

As discussed above, the T2 process sends a message to the session manager 600 via the STQ1 queue 560, regardless of whether the step is an automated computation or a manual step. The session manager 600 then posts the step in status list 602. Even manual steps to be performed by a human principal are nominally executed by a computer in that a selected computer processor is needed to execute the application program that notifies the human principal.

The notification step goes through the same basic steps as other steps during execution. Thus, it picks up input parameters via the T3 process. Input parameters for a notification step will include the information needed by the human principal to perform a particular step. That information may simply identify the task to be performed, or it may include things such as one or more associated files. Information may also be passed to a principal using mechanisms outside of the data flows associated with the arcs between steps. For instance, information related to a project may be stored in various files in secondary memory. When a notification message is sent to a human or even an automated principal working on the project, the notification message may simply indicate the name of the file rather than actually passing a copy of the file as an input parameter.

A similar indirect information passing mechanism can be used to communicate information between different work flow instances, which normally cannot communicate with one another, by including in each work flow a step that either reads or writes information in a predefined place (such as a disk file) that is accessable by the other.

For steps that may take a long time to be performed by a human principal, the application program 620 may actually consist of a number of programs. For instance, one program may send the notification, a second program may be used to send periodic follow up reminder messages to the human principal (sometimes called an agent), and a third program may be used by the human agent to indicate that the step has been completed. In this example, the third program notifies process T3 that the "application program" is done, and also passes to T3 a pointer to any outputs generated, after which T3 durably stores data representing the results of executing the step in the system's history database.

The application program in a notification step does not complete its execution until it receives a "task completed" command back from the principal to whom the notification is sent. In many instances, a file or other set of data will be conveyed by the principal who completes a particular step to the system for forwarding onto subsequent steps of the flow. For instance, if the human principal's job was to edit a newspaper article to fit a specified number of newspaper "column inches", the output from the application program associated with this step would be a file containing the edited newspaper article.

Alternately, the results of a step performed by a human principal can be conveyed using mechanisms outside the data flows associated with the flow controller by storing the results of the step in an file on disk for use by a subsequent step. In this scenario, the file can either be assigned a previously agreed upon file name, in which case the step produces no outputs other than an indication that it has been completed, or the file's name can be passed to subsequent steps as an output parameter in one or more output event signals.

Control Steps

Most steps of a work flow are modeled as a simple step with one input port and one output port, where the messages associated with the input and output ports are structured to convey the information associated with the task being modeled. Such a simple step is easy to understand and use because it has only one input condition and only one output condition. Such steps can be designed relatively independently of the flow context in which it is to be referenced.

A work flow connects these simple steps together, and it can make use of control steps to provide creative connections. For example, if two steps A and B are to be connected as from A to B, and A's output message does not quite match B's input message, the work flow description can be set up to include a control step C between steps A and B to map the data in the message fields. If the mapping of input and output message fields involves more than just data field shuffling, it may be necessary to write a special application program that performs this mapping, and then to have step C defined so as to execute that program. While step A could be rewritten to perform both its main function as well as the functions of step C, providing a separate control step is helpful because it allows the main execution steps to be designed relatively independently of their flow context.

In another example, if after a step A, two steps B and C can proceed in parallel with data from A split in some way, then one can place inbetween a control step that has one input port and two output ports and the data mapping required to split up the data.

If two steps B and C are to be joined before step E can proceed, then a control step with two input ports and one output port can be placed after B and C and before E, which joins steps B and C's outputs and produces a single message to start step E.

Using the same principal, flows may also be designed such that they have a single input port and a single output port for ease of embedding these flows in other flows.

If a user wishes to be explicitly notified that a certain point in a work flow has been reached, and wished to suspend the work flow until he consents, a "breakpoint control step" can be inserted in the flow with the user specified as the authorizing resource to "restart" it again. A break point step can be inserted as a special application step, with the user as its target of notification. The user will see the breakpoint in his normal work-to-do processing when the breakpoint is reached. Further, the client may incorporate a simple program which allows the user to send a step termination message back to the flow controller at the user's command.

Delays can be introduced between two steps (e.g., to make sure that a grace period is honored before taking some action) by adding a "delay control step" to the work flow description. The delay control step can be set up to call a special application program that monitors a clock to determine when to send a "step termination" message back to the flow controller.

Log Record Database and System Failure Recovery

An important aspect of the present invention is reliable recovery from system failures. For long running work flows, recovery of intermediate results is important to avoid having to unnecessarily restart such work flows at their very beginning.

Figure 20:
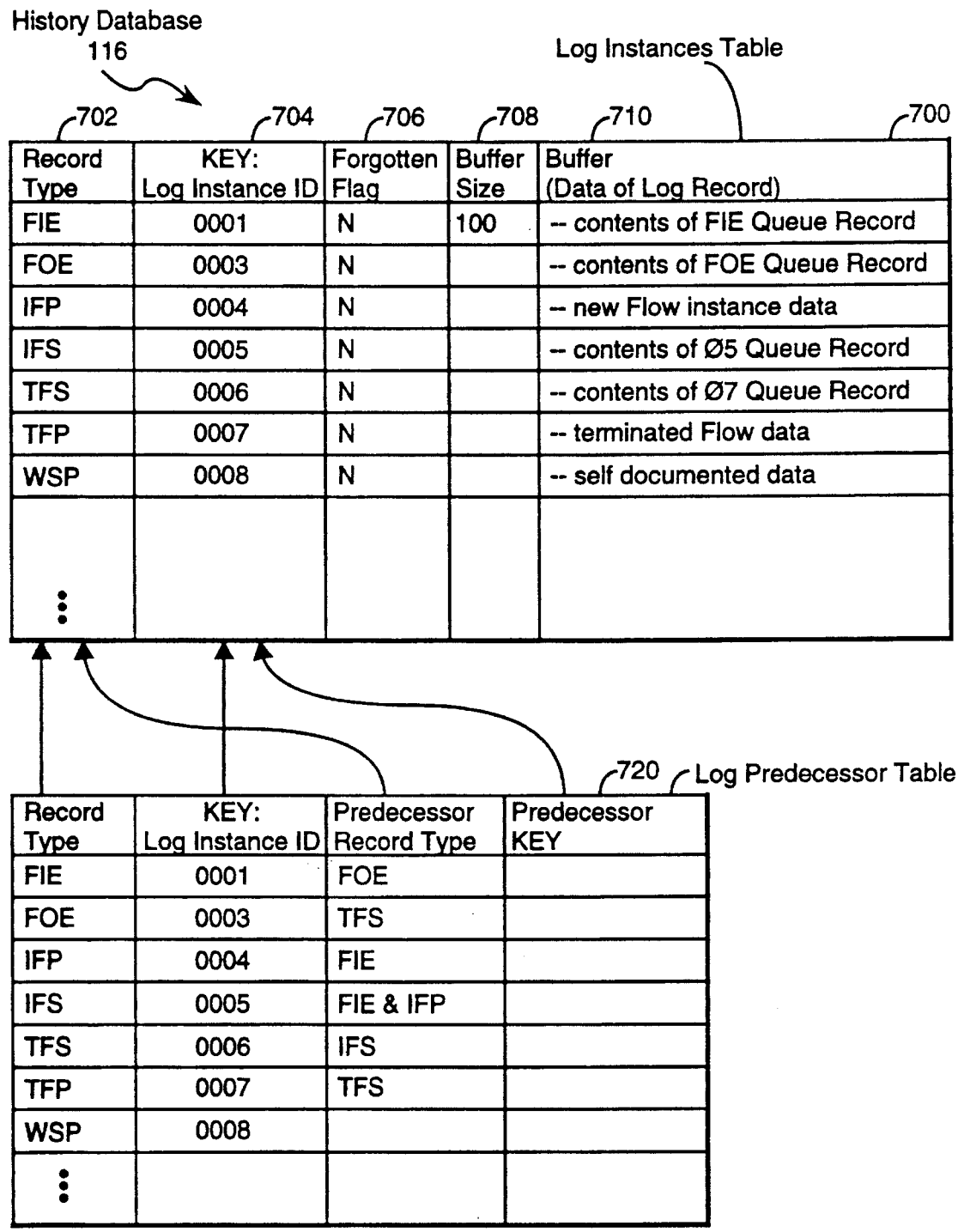
FIG. 20 depicts the structure of the history database used in the preferred embodiment.

Referring to FIG. 20, in the preferred embodiment, several types of log records are generated. The main types of log records are listed in FIG. 20. As can be seen, FIE, FOE, IFS (instantiate flow step) and TFS (terminate flow step) log records contain copies of records from the FIE, FOE, Φ5 and Φ7 queues. FIE log records are generated by the T5 Arc Resolution process and the Post Server, FOE records are generated by the T4 Termination process, IFS records are generated by the T1 Input Data Mapping process, and TFS records are generated by the T3 Application Manager process.

The IFP (instantiate flow process) and TFP (terminate flow process) log records are generated by the T1 and T4 processes, respectively. The WSP log records contain the data values referenced by the workspace descriptors in the various queue records. The WSP log records store this data in a self-documenting format so that the data type and associated event field for each datum is specified by the WSP log record. Furthermore, the FIE, FOE and other log records reference corresponding ones of the WSP log records by way of the workspace descriptor field at the end of those records, thereby providing access to the event field data values that are needed for recovering from a system failure.

There are no log records corresponding to the STQ1 queue, STQ2 queue and S_R2 work to do list. However, each of the STQ1 queue, STQ2 queue and S_R2 work to do list are independently durably stored so that these entire data structures can be reconstructed in the event of a system failure.

The structure of the History Database 116, also herein called the Log Record Database, includes two tables 700 and 720. The first table 700 contains the log records, each of which includes a "record type" field 702, indicating the type of the log record, a unique key value 704 to provide quick access to a specified log record (the key value need only be unique for its particular record type), a forgotten flag 706 that indicates whether the log record would be needed for system recovery, a buffer size value 708 indicating the total size of the log record, and a data buffer 710 in which all the data fields for the log record are stored.

The second table 720 is used to find the "predecessor" of each log record, which enables one to recreate the chain of events in the processing of a flow. Each record in this table 720 includes the same record type and key value as in the first table 700, plus the record type and key value of the log record's predecessor.

Figure 21:
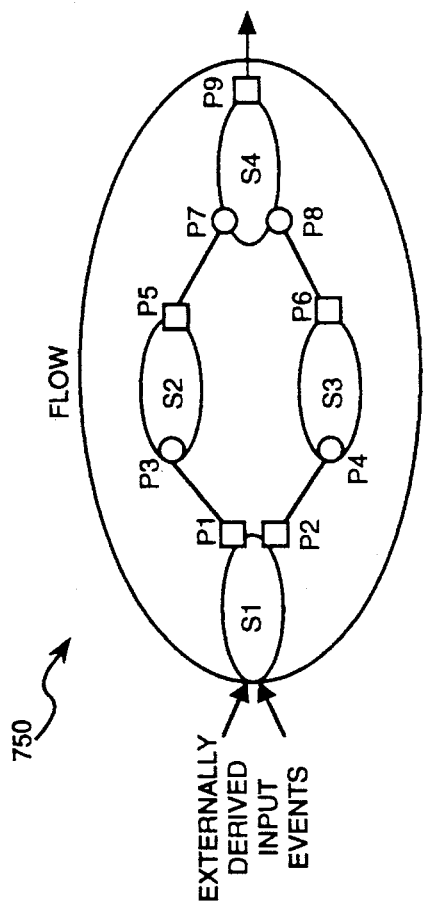
FIGS. 21 and 22 represent a work flow and a corresponding set of log records stored in the history database in the preferred embodiment.
Figure 22:
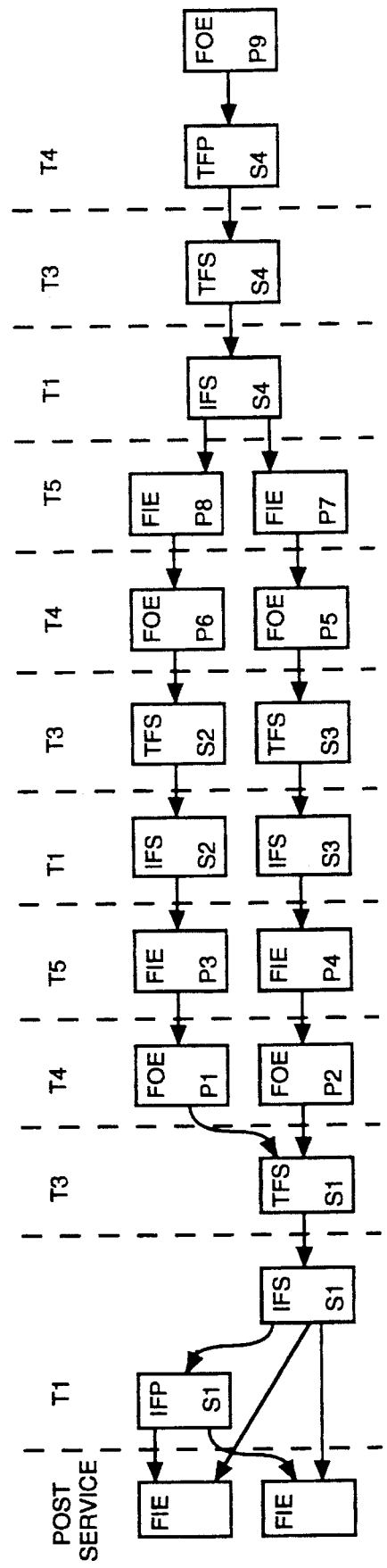

Referring to FIGS. 21 and 22, the concept of predecessor log records is explained by example. In FIG. 21 there is shown a flow with four steps S1, S2, S3, S4. The four steps have input and output ports, here labelled P1 through P9. The flow is initiated by receipt of two eternally derived input event signals.

Referring to FIGS. 13, 21 and 22, to understand the set of log records generated during execution of the flow 750, it is helpful to look at the processing loop of FIG. 13. The time line in FIG. 22 goes from left to right, and the top row of FIG. 22 indicates the process that generates each log record. Each legend in each box indicates the record type of the log record generated, as well as the step or input/output port associated with the log record. The arrows pointing backwards in time indicate which log record is the predecessor of each other log record.

Starting at the left side of FIG. 22, the first two FIE log records reflect the externally derived input signals. Next, the T1 process instantiates the flow, creating an IFP log record and step S1 of the flow is also instantiated, creating an IFS log record. After executing step S1, the T3 process generates and TFS log record, and the T4 process generates two FOE log records corresponding to the output event signals generated for ports P1 and P2. This chain of events continues until completion of step S4 of the flow, with processes T1, T3, T4 and T5 generating log records along the way, each log record pointing to its predecessor in the work flow.

All the log records for all the ongoing work flows are dumbly stored, typically on disk storage devices, usually in a simple time sequential order. Whenever a flow is completed, the T4 process generates a terminal flow (TFP) log record as well as an FOE log record for each output event signal. Then the T4 process marks all the log records for the flow that are now unnecessary for system recovery as "forgotten" using the Forgotten Flag field of the log records shown in FIG. 20. In particular, only the IFP, TFP log records, and the FOE log records for output events output by the flow need to be retained for system recovery purposes. Tracing through all the log records for a completed flow is accomplished using the predecessor pointers provided by the second history database table 720.

In the event of a system failure, the log records in the history database are inspected so as to regenerate all the items that belong in the FIE, FOE, Φ5, and Φ7 queues. This is done by reviewing the log records for each long running work flow, finding the point at which each flow and step was interrupted by the system failure, regenerating the corresponding queue records from the data in the log records, and the restarting the T1 through T5 processes.

The history inspector module 128, as mentioned above with regard to FIG. 2, provides a user interface for checking on the status of executing work flows. The history inspector module 128 retrieves the log records for specified work flow instances and generates status information which summarizes the status of each work flow instance. For instance, the generated status information will typically include the amount of time elapsed since initiation of the work flow instance, a list of the work flow steps that are pending, and a list of any work flow steps that failed, timed out, or have otherwise encountered a problem that is blocking forward progress of the work flow instance.

A manager with authority to use the history inspector module can not only review the status of all pending work flows, but also can review all the pending work flow steps assigned to each principal (i.e., person, computer or machine) and can facilitate the completion of work flows by reassigning pending work flow steps from one principal to another. For instance, if a work flow step has been assigned to a first person who is sick, or backlogged with work, or otherwise unable to attend to the pending work flow step, the manager can review the work loads of other principals and then re-assign some of the steps from the first person to one of the other principals based on the information obtained from the history database. Each time that a work flow step is "manually" reassigned to a new principal in this manner, a corresponding log record is stored in the history database 116 so that the status of the work flow can continue to be accurately monitored.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A work flow management system, comprising:

a computer system having memory means for storing data and communication means for communicating with a multiplicity of resources, said resources including a multiplicity of human principals;

work flow description means for storing in said memory means work flow description data representing a plurality of work flow types; each said work flow type being represented by said work flow description data as a set of steps with information flows therebetween; said work flow description data including data representing information flows in and out of each said step;

wherein at least a plurality of said steps of each said work flow type comprises notification of one of said principals of a specified task to be performed as part of said work flow type, execution of said task by said one principal, and notification of said work flow management system by said principal when said specified task has been completed; wherein said notifications are performed via said communication means;

a work flow controller, coupled to memory means for accessing said work flow description data, for creating a plurality of work flow instances comprising instances of various ones of said work flow types, and for controlling execution of said work flow instances;

said work flow controller including means for initiating execution of a first step in each created work flow instance and for initiating execution of each other step in each created work flow instance when predefined input data criteria for each said step are fulfilled by information flows from other ones of said steps;

said work flow controller including means for durably storing results from each executed step; and history management means including means for storing and retrieving status data concerning said created work flow instances during execution thereof, wherein said status data includes status information for each said step of said created work flow instances;

whereby work flows are executed in units of steps, and each work flow's status is tracked by storage of status data concerning execution of the steps associated with said each work flow.

2. The work flow management system of claim 1, wherein said work flow description means includes output event table means for defining a plurality of output event signals generated by each said step of each said work flow type, port table means for defining input ports for each said step of each said work flow type, and arc table means for storing data denoting for each said defined output event signal a destination step and said destination step's input port to which said output event signal should be sent; and wherein said work flow controller includes (A) step termination means for receiving a plurality of output parameters generated by executed said steps of said created instances of said work flow types and generating a corresponding set of said output event signals in accordance with said output event table means, and (B) arc resolution means for routing said output event signals to input ports of said corresponding steps of said created instances of said work flow types in accordance with said arc table means.

3. The work flow management system of claim 1, wherein said flow controller includes means for generating a plurality of durable log records corresponding to (A) each said created instance, (B) termination of execution of each said created instance, (C) each said initiated step of each said created instance, and (D) termination of each said step of each said created instance; and wherein said work flow management system includes restarting means for restarting any said created instances interrupted by a system failure by reviewing said durable log records and restarting execution of said interrupted work flow instances so as to avoid reexecuting steps thereof that have already been terminated.

4. The work flow management system of claim 1, wherein said flow description means includes output event definition means for defining for any specified one of said steps (A) a plurality of output conditions, (B) criteria for selecting one of said output conditions after executing said step, (C) event signals, associated with each said defined output condition, to be generated after executing said step, including a specification of a plurality of parameters to be included in each said event signal, and (D) data denoting for each said output event signal a destination step to which said output event signal is to be sent; and said work flow controller includes means for (A) evaluating said criteria for selecting one of said output conditions after executing each said step, (B) generating said event signals in accordance with said selected output condition after executing said step, and (C) sending said generated output event signals to the corresponding destination step defined by said flow description means;

whereby specified ones of said steps can send different output event signals to different destination steps in accordance with the defined criteria that are evaluated after execution of said specified ones of said steps.

5. The work flow management system of claim 1, wherein said work flow description means includes a plurality of resource resolution functions, each resource resolution function defining criteria for selecting a resource to execute a specified one of said steps when said specified step is instantiated;

said flow description means also includes means for associating with each said defined step one of said resource resolution functions;

said work flow controller includes means for executing, each time that any of said steps is instantiated, the resource resolution function associated with said instantiated step and thereby selecting the associated resource for executing said instantiated step.

6. The work flow management system of claim 5, wherein said work flow controller includes a plurality of concurrently executing processes for instantiating said steps of said created instances, for selecting a resource to execute each instantiated step, for receiving output event signals generated by executed steps, and for sending said output event signals to others of said steps of said created instances; wherein the number of said concurrently executing processes in said work flow controller remains constant regardless of the number of said instantiated steps extant in the system.

7. The work flow management system of claim 1, wherein said work flow controller performs a plurality of separate, durably stored, transactions and includes (A) means for instantiating each said step of said created instances (B) means, operable after execution of each said step by a selected resource, for receiving a plurality of output event signals from said resource, and (C) means for mapping said received output event signals into a plurality of input event signals for others of said steps.

8. In a distributed computer system having a multiplicity of interconnected computers, a method of performing a plurality of work flows, the steps of the method comprising:

storing in a computer memory flow description data representing each of a multiplicity of work flow types as a set of steps with information flows therebetween, including means for representing information flows in and out of each said step;

after said storing step, creating a plurality of instances of an individual one of said multiplicity of work flow types when corresponding input events are received;

controlling execution of said created instances, including the step of initiating execution of said set of steps for each said created instance represented by said flow description data;

durably storing a plurality of results from each said executed step;

storing status data concerning said created instances during execution thereof, wherein said status data includes status information for each said step of said created instances; and retrieving said status data when reviewing the status of said instances and when recovering from an interruption in execution of said created instances by a system failure, whereby each said executed instance comprises a performed work flow.

9. The method of performing work flows of claim 8, wherein said flow description data includes output event data defining a plurality of output event signals generated by each said step of each said work flow type, port data for defining a plurality of input ports for each said step of each said work flow type, and arc data denoting for each said defined output event signal a destination step and said destination step's input port to which said output event signal should be sent; and said method further includes the steps of (A) receiving a plurality of output parameters generated by executed steps of said created instances and generating a corresponding set of said output event signals in accordance with said output event data, and (B) routing said output event signals to input ports of corresponding steps of said created instances in accordance with said arc data.

10. The method of performing work flows of claim 8, further including generating durable log records corresponding to (A) each said created instance, (B) termination of execution of each said created instance, (C) each said initiated step of each said created instance, and (D) termination of each said step of each said created instance; and restarting ones of said created instances interrupted by a system failure by reviewing said durable log records and restarting execution of said interrupted instances so as to avoid reexecuting the steps thereof that have already been terminated.

11. The method of performing work flows of claim 8, wherein said flow description data includes output event data defining for any specified one of said steps (A) a plurality of output conditions, (B) criteria for selecting one of said output conditions after executing said step, (C) a plurality of output event signals, associated with each said defined output condition, to be generated after executing said step, including a specification of parameters to be included in each said output event signal, and (D) data denoting for each said event signal a destination step to which said event signal is to be sent; and said method further includes the steps of (A) evaluating said criteria for selecting one of said output conditions after executing each said step, (B) generating said output event signals in accordance with the selected output condition after executing said step, and (C) sending said generated output event signals to the corresponding destination step defined by said flow description data;

whereby specified ones of said steps can send different output event signals to different destination steps in accordance with the defined criteria that are evaluated after execution of said specified ones of said steps.

12. The method of performing work flows of claim 8, wherein said flow description data includes data associating with each one of said defined steps a resource resolution function that selects a resource to execute said defined step when said defined step is instantiated; and said method further includes the step of executing, each time that any of said steps is instantiated, the resource resolution function associated with said instantiated step and thereby selecting a resource for executing said instantiated step.

13. The method of performing work flows of claim 12, further including the steps of concurrently executing a plurality of processes for instantiating said steps of said created instances, for selecting a resource to execute each instantiated step, for receiving output event signals generated by said executed steps, and for sending said output event signals to of said other steps of said created instances; wherein the number of said concurrently executing processes remains constant regardless of the number of said instantiated steps extant in the system.

14. The method of performing work flows of claim 8, further including the step of performing a plurality of separate, durably stored, transactions includes the steps of: (A) instantiating each said step of said created instances of work flows, (B) after execution of each said step by a selected resource, receiving a plurality of output event signals from said resource, and (C) mapping said received output event signals into a plurality of input event signals for others of said steps.

15. A work flow management system, comprising:

a computer system having memory means for storing data;

work flow description means for storing in said memory means work flow description data representing a plurality of work flows types; each said work flow type being represented by said work flow description data as a set of steps;

a work flow controller that tracks execution of multiple instances of each said work flow type and generates log messages when each said step of a work flow instance is initiated and when each said step is completed;

a work flow history database that receives and stores said log messages in said memory means; and history management means, responsive to work flow status inquiries, for retrieving said log messages from said work flow history database and generating status information concerning specified ones of said work flow instances;

whereby each work flow instance's status is tracked by storage of data concerning execution of the steps associated with each said work flow instance.

\* \* \* \* \*